(12) United States Patent
Liu et al.

(10) Patent No.: US 12,442,370 B2
(45) Date of Patent: *Oct. 14, 2025

(54) FRACTURING EQUIPMENT HAVING MULTIPLE ELECTRIC-POWER SUPPLIES

(71) Applicant: YANTAI JEREH PETROLEUM EQUIPMENT & TECHNOLOGIES CO., LTD., Yantai (CN)

(72) Inventors: Kaishen Liu, Yantai (CN); Shouzhe Li, Yantai (CN); Zhuqing Mao, Yantai (CN); Sheng Chang, Yantai (CN); Shuzhen Cui, Yantai (CN); Liang Lv, Yantai (CN); Jifeng Zhong, Yantai (CN); Shanwu Fu, Yantai (CN); Chunqiang Lan, Yantai (CN); Ruijie Du, Yantai (CN); Jian Zhang, Yantai (CN); Xiaolei Ji, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 48 days.

This patent is subject to a terminal disclaimer.

(21) Appl. No.: 18/167,676

(22) Filed: Feb. 10, 2023

(65) Prior Publication Data
US 2023/0193734 A1 Jun. 22, 2023

Related U.S. Application Data

(63) Continuation-in-part of application No. 17/325,955, filed on May 20, 2021, now Pat. No. 11,596,047, and
(Continued)

(30) Foreign Application Priority Data

Apr. 7, 2021 (CN) .......................... 202120706298.3
May 12, 2021 (CN) .......................... 202121008278.5
(Continued)

(51) Int. Cl.
E21B 43/26 (2006.01)
F04B 17/03 (2006.01)
(Continued)

(52) U.S. Cl.
CPC .......... *F04B 53/08* (2013.01); *E21B 43/2607* (2020.05); *F04B 17/03* (2013.01);
(Continued)

(58) Field of Classification Search
CPC ...... E21B 43/2607; F04B 53/08; F04B 53/18; F04B 17/03; F04B 23/023; F04B 49/02; F16N 7/38; F16N 13/06; F16N 39/02
(Continued)

(56) References Cited

U.S. PATENT DOCUMENTS 2,701,970 A 2/1955 Kraus
3,952,218 A 4/1976 Deters
(Continued)

FOREIGN PATENT DOCUMENTS

CH 620059 A5 10/1980
CN 202153558 U 2/2012
(Continued)

OTHER PUBLICATIONS

Non-Final Office Action for U.S. Appl. No. 18/307,177 mailed on Nov. 24, 2023.
(Continued)

*Primary Examiner* — Charles G Freay
(74) *Attorney, Agent, or Firm* — Sheppard Mullin Richter & Hampton LLP

(57) ABSTRACT

Fracturing equipment includes an electric-driven apparatus and an electric-power supply apparatus. The electric-driven apparatus includes at least one motor, at least one lubrication module, and at least one heat dissipation module. The electric-power supply apparatus includes a first electric-power supply and a second electric-power supply, where the at least one motor is powered by the first electric-power supply, and the at least one lubrication module and the at least one heat dissipation module are powered by at least one of the first electric-power supply or the second electric-power supply.

18 Claims, 8 Drawing Sheets

Related U.S. Application Data a continuation-in-part of application No. 17/743,267, filed on May 12, 2022, now Pat. No. 11,668,289, which is a continuation of application No. PCT/CN2022/070479, filed on Jan. 6, 2022, application No. 18/167,676 is a continuation-in-part of application No. 17/698,644, filed on Mar. 18, 2022, now Pat. No. 11,859,481.

(30) Foreign Application Priority Data

Oct. 14, 2021 (CN) .......................... 202111198126.0
Oct. 14, 2021 (CN) .......................... 202122477998.2

(51) Int. Cl.

| | |
|---|---|
| F04B 23/02 | (2006.01) |
| F04B 49/02 | (2006.01) |
| F04B 53/08 | (2006.01) |
| F04B 53/18 | (2006.01) |
| F16N 7/38 | (2006.01) |
| F16N 13/06 | (2006.01) |
| F16N 39/02 | (2006.01) |

(52) U.S. Cl.
CPC .......... *F04B 23/023* (2013.01); *F04B 49/02* (2013.01); *F04B 53/18* (2013.01); *F16N 7/38* (2013.01); *F16N 13/06* (2013.01); *F16N 39/02* (2013.01)

(58) Field of Classification Search
USPC ........................................................ 323/201
See application file for complete search history.

(56) References Cited

U.S. PATENT DOCUMENTS

| | | | |
|---|---|---|---|
| 4,331,112 A | 5/1982 | Pluequet | |
| 4,371,112 A | 2/1983 | Tholen | |
| 4,471,233 A * | 9/1984 | Roberts | H02J 9/062 307/66 |
| 5,067,454 A | 11/1991 | Waddington et al. | |
| 5,767,591 A * | 6/1998 | Pinkerton | H02J 9/062 307/64 |
| 6,069,781 A | 5/2000 | Wingate et al. | |
| 6,188,552 B1 | 2/2001 | Jaeschke et al. | |
| 6,232,751 B1 | 5/2001 | Farr et al. | |
| 6,397,156 B1 | 5/2002 | Bachmann et al. | |
| 6,401,870 B2 | 6/2002 | Roy et al. | |
| 6,535,369 B1 | 3/2003 | Redding et al. | |
| 7,728,583 B2 | 6/2010 | Waters et al. | |
| 7,886,875 B2 | 2/2011 | Shevchencko et al. | |
| 7,940,041 B2 | 5/2011 | Waters et al. | |
| 8,495,857 B2 | 7/2013 | Papa et al. | |
| 8,798,803 B2 | 8/2014 | Bush et al. | |
| 9,444,232 B2 | 9/2016 | Warren | |
| 10,233,773 B2 | 3/2019 | Schwarz et al. | |
| 10,436,067 B2 | 10/2019 | Dolman et al. | |
| 10,648,311 B2 * | 5/2020 | Oehring | H02J 3/38 |
| 10,724,343 B2 | 7/2020 | Lucas et al. | |
| 10,741,158 B1 | 8/2020 | Aune | |
| 10,753,165 B1 | 8/2020 | Fischer et al. | |
| 10,871,045 B2 | 12/2020 | Fischer et al. | |
| 10,961,993 B1 | 3/2021 | Ji et al. | |
| 10,982,498 B1 | 4/2021 | Fischer et al. | |
| 11,114,857 B2 * | 9/2021 | Hinderliter | H02J 3/381 |
| 11,125,034 B2 | 9/2021 | Fischer et al. | |
| 11,156,044 B2 | 10/2021 | Fischer et al. | |
| 11,209,124 B2 * | 12/2021 | Wagner | F16N 13/04 |
| 11,286,736 B2 | 3/2022 | Fischer et al. | |
| 11,460,018 B2 | 10/2022 | Brunson, Jr. | |
| 11,525,399 B1 | 12/2022 | Smith | |
| 11,668,289 B2 * | 6/2023 | Chang | F04B 15/02 417/63 |
| 11,859,481 B2 | 1/2024 | Fu et al. | |
| 11,859,482 B2 * | 1/2024 | Yeung | F04B 23/06 |
| 12,006,925 B2 | 6/2024 | Chang et al. | |
| 12,013,082 B2 | 6/2024 | Charrier et al. | |
| 12,078,044 B2 * | 9/2024 | Zhong | E21B 43/2607 |
| 2002/0172604 A1 | 11/2002 | Berger | |
| 2006/0081419 A1 | 4/2006 | Care et al. | |
| 2008/0007256 A1 | 1/2008 | Waters et al. | |
| 2010/0154427 A1 | 6/2010 | Logan | |
| 2010/0201354 A1 | 8/2010 | Waters et al. | |
| 2012/0261986 A1 | 10/2012 | Ichikawa | |
| 2012/0272764 A1 | 11/2012 | Pendleton | |
| 2013/0006434 A1 | 1/2013 | Bush et al. | |
| 2013/0306322 A1 | 11/2013 | Sanborn et al. | |
| 2014/0070756 A1 | 3/2014 | Kearns et al. | |
| 2014/0139349 A1 | 5/2014 | Vilcinskas et al. | |
| 2015/0103460 A1 | 4/2015 | Brinner | |
| 2016/0006222 A1 | 1/2016 | Warren | |
| 2016/0013644 A1 | 1/2016 | Mitsutani | |
| 2016/0028229 A1 | 1/2016 | Mitsutani | |
| 2016/0079684 A1 | 3/2016 | Naganishi et al. | |
| 2016/0258267 A1 | 9/2016 | Payne et al. | |
| 2016/0305284 A1 | 10/2016 | Mastro et al. | |
| 2017/0237383 A1 | 8/2017 | Buffenbarger et al. | |
| 2017/0331203 A1 | 11/2017 | Mundle | |
| 2018/0248351 A1 | 8/2018 | Vail et al. | |
| 2018/0298731 A1 | 10/2018 | Bishop | |
| 2018/0328157 A1 | 11/2018 | Bishop | |
| 2019/0154020 A1 | 5/2019 | Glass | |
| 2019/0218890 A1 | 7/2019 | Lucas et al. | |
| 2019/0234146 A1 | 8/2019 | Weightman | |
| 2019/0346038 A1 | 11/2019 | Omae et al. | |
| 2020/0061500 A1 | 2/2020 | Hohnstein | |
| 2020/0208776 A1 | 7/2020 | Bayyouk | |
| 2020/0332788 A1 | 10/2020 | Cui et al. | |
| 2020/0340313 A1 | 10/2020 | Fischer et al. | |
| 2021/0108473 A1 | 4/2021 | Fischer et al. | |
| 2021/0130113 A1 | 5/2021 | Shepherd | |
| 2021/0222503 A1 * | 7/2021 | Fischer | F04B 47/02 |
| 2021/0301608 A1 | 9/2021 | Fischer et al. | |
| 2021/0396236 A1 | 12/2021 | Grode et al. | |
| 2022/0042385 A1 | 2/2022 | Fischer et al. | |
| 2022/0220816 A1 | 7/2022 | Fischer et al. | |

FOREIGN PATENT DOCUMENTS

| | | |
|---|---|---|
| CN | 102668301 A | 9/2012 |
| CN | 102200589 B | 4/2013 |
| CN | 203289378 U | 11/2013 |
| CN | 203967261 U | 11/2014 |
| CN | 204060629 U | 12/2014 |
| CN | 204532531 U | 8/2015 |
| CN | 105508044 A | 4/2016 |
| CN | 106522909 A | 3/2017 |
| CN | 107327686 A | 11/2017 |
| CN | 207530121 U | 6/2018 |
| CN | 106655055 B | 7/2018 |
| CN | 207781218 U | 8/2018 |
| CN | 109779373 A | 5/2019 |
| CN | 208939165 U | 6/2019 |
| CN | 110485984 A | 11/2019 |
| CN | 110608028 A | 12/2019 |
| CN | 110645156 A | 1/2020 |
| CN | 210049880 U | 2/2020 |
| CN | 210105985 U | 2/2020 |
| CN | 210111299 U | 2/2020 |
| CN | 111188763 A | 5/2020 |
| CN | 210722532 U | 6/2020 |
| CN | 210838137 U | 6/2020 |
| CN | 111404033 A | 7/2020 |
| CN | 111441923 A | 7/2020 |
| CN | 210919013 U | 7/2020 |
| CN | 111502970 A | 8/2020 |
| CN | 211500798 U | 9/2020 |
| CN | 112018696 A | 12/2020 |
| CN | 112145142 A | 12/2020 |
| CN | 112160904 A | 1/2021 |
| CN | 112265475 A | 1/2021 |
| CN | 112323406 A | 2/2021 |

(56) References Cited

FOREIGN PATENT DOCUMENTS

| | | |
|---|---|---|
| CN | 112780245 A | 5/2021 |
| CN | 113006758 A | 6/2021 |
| CN | 113153729 A | 7/2021 |
| CN | 214247597 U | 9/2021 |
| CN | 214330604 U | 10/2021 |
| CN | 214429328 U | 10/2021 |
| CN | 113819030 A | 12/2021 |
| CN | 215111965 U | 12/2021 |
| CN | 215860646 U | 2/2022 |
| EP | 0257879 A1 | 3/1988 |
| EP | 0978919 A2 | 2/2000 |
| EP | 3301775 A1 | 4/2018 |
| JP | 2001167814 A | 6/2001 |
| JP | 2022100785 A | 7/2022 |
| WO | 9419860 A1 | 9/1994 |
| WO | 2014189054 A1 | 11/2014 |
| WO | 2019/046680 A1 | 3/2019 |

OTHER PUBLICATIONS

Non-Final Office Action for U.S. Appl. No. 18/307,239 mailed on Jul. 16, 2024.
Non-Final Office Action for U.S. Appl. No. 18/526,658 mailed on Aug. 5, 2024.
Non-Final Office Action for U.S. Appl. No. 17/869,526 mailed on Dec. 4, 2024.
Notice of Allowance for U.S. Appl. No. 18/526,658 mailed on Nov. 13, 2024.
Non-Final Office Action for U.S. Appl. No. 17/743,267 mailed on Sep. 16, 2022.
Written Opinion and International Search Report for PCT Application No. PCT/CN2022/070479 mailed on Apr. 1, 2022.
Written Opinion and International Search Report for PCT Application No. PCT/CN2022/073164 mailed on Jun. 1, 2022.
Non-Final Office Action for U.S. Appl. No. 17/325,955 mailed on Aug. 15, 2022.
Final Office Action for U.S. Appl. No. 17/869,336 mailed on Dec. 27, 2022.
The Britannica Dictionary, "wire", https://www.britannica.com/dictionary/wire, retrived on Dec. 20, 2022.
D&F Liquidators, "Understanding Electrical Grounding and How it Works", https://www.dfliq.net/blog/understanding-electrical-grounding/, retrieved on Dec. 20, 2022.
International Preliminary Report on Patentability Chapter I for International Application No. PCT/CN2022/073164 mailed on Apr. 25, 2024.
Final Office Action for U.S. Appl. No. 18/307,239 mailed on Oct. 22, 2024.
First Office Action for Chinese Application No. 202111198126.0 mailed on Dec. 17, 2024.
First Search for Chinese Application No. 202111198126.0 mailed on Dec. 16, 2024.
Non-Final Office Action for U.S. Appl. No. 18/307,239 mailed on Apr. 3, 2025.
Non-Final Office Action for U.S. Appl. No. 18/651,148 mailed on Mar. 27, 2025.
Notice of Allowance for U.S. Appl. No. 17/869,526 mailed on Mar. 19, 2025.
Notice of Allowance for U.S. Appl. No. 18/314,312 mailed on Apr. 2, 2025.
Second Office Action for Chinese Application No. 202111198126.0 mailed on Apr. 1, 2025.
Notice of Allowance for U.S. Appl. No. 18/651,148 mailed on Jul. 1, 2025.
Final Office Action for U.S. Appl. No. 18/307,239 mailed on Aug. 11, 2025.
Rejection Decision for Chinese Application No. 202111198126.0 mailed on Jul. 15, 2025 with summary in English.

* cited by examiner

FRACTURING EQUIPMENT HAVING MULTIPLE ELECTRIC-POWER SUPPLIES

CROSS-REFERENCE OF RELATED APPLICATIONS

This application is a continuation-in-part application of U.S. application Ser. No. 17/325,955 filed on May 20, 2021, now issued as U.S. Pat. No. 11,596,047, which claims priority of the Chinese Utility Model application No. 202120706298.3 filed on Apr. 7, 2021, and of U.S. application Ser. No. 17/743,267 filed on May 12, 2022, now issued as U.S. Pat. No. 11,668,289, which is a continuation application of International Application No. PCT/CN2022/070479 filed on Jan. 6, 2022, which claims priority to Chinese patent application No. 202121008278.5 filed on May 12, 2021, and of U.S. application Ser. No. 17/698,644 filed on Mar. 18, 2022, now issued as U.S. Pat. No. 11,859,481, which claims priority to Chinese patent application No. 202111198126.0 filed on Oct. 14, 2021 and Chinese Patent Application No. 202122477998.2 filed on Oct. 14, 2021. The content of all of the above applications are incorporated herein by reference in their entirety as a part of the present application.

TECHNICAL FIELD

Embodiments of the disclosure relate to a fracturing well site system.

BACKGROUND

Fracturing refers to a method of forming fractures in underground oil-gas layer by hydraulic action in the process of exploiting oil and gas, and is also known as hydraulic fracturing. With the exploitation of shale gas in recent years, large-scale fracturing operation has gradually developed and adopted. Most of the fracturing operations are based on a diesel-driven apparatus, and the diesel-driven apparatus has the disadvantages of low power density, high noise and large environmental pollution. In view of the above problems, a well site operation system is developed, in which an electric-driven apparatus is mainly used and the diesel-driven apparatus severs as an auxiliary apparatus. The electric-driven apparatus uses the power supplied from electric-power supply apparatus, and the electric-power supply apparatus often is an electric motor, which has high power density, low noise and no waste pollution. However, the well site using the electric-driven apparatus uses high-voltage electricity as the power, accidents such as fire and explosion caused by electric shock may occur.

SUMMARY

Embodiments of the disclosure provides a fracturing well site system. In one aspect, fracturing equipment is provided. The fracturing equipment includes an electric-driven apparatus and an electric-power supply apparatus. The electric-driven apparatus includes at least one motor, at least one lubrication module, and at least one heat dissipation module. The electric-power supply apparatus includes a first electric-power supply and a second electric-power supply, where the at least one motor is powered by the first electric-power supply, and the at least one lubrication module and the at least one heat dissipation module are powered by at least one of the first electric-power supply or the second electric-power supply.

In at least some embodiments, the at least one motor is configured to power the at least one pump.

In at least some embodiments, the second electric-power supply is coupled to the first electric-power supply, and configured to supply power to the first electric-power supply.

In at least some embodiments, the fracturing equipment further includes a grounding system. The grounding system includes a first grounding terminal which is spaced from each of the electric-driven apparatus and the electric-power supply apparatus by a preset distance. At least one of the electric-driven apparatus and the electric-power supply apparatus are connected to the first grounding terminal, and the first grounding terminal is configured to ground the at least one of the electric-driven apparatus and the electric-power supply apparatus.

In at least some embodiments, the electric-power supply apparatus further includes an electric-power converter device electrically connected with the first electric-power supply, and an electric-power distribution device electrically connected with the electric-power converter device. At least one of the electric-power converter device and the electric-power distribution device is connected to the first grounding terminal.

In at least some embodiments, the grounding system includes a first grounding wire, and at least one of the electric-power converter device and the electric-power distribution device is connected to the first grounding wire and is connected to the first grounding terminal through the first grounding wire.

In at least some embodiments, the first grounding wire is configured to surround the at least one of the electric-power converter device and the electric-power distribution device, and a planar shape of the first grounding wire is a closed loop.

In at least some embodiments, the at least one lubrication module comprises a lubricating oil tank defining an accommodation space, at least one lubrication pump having a lubrication pump oil inlet and a lubrication pump oil outlet that are coupled to each other, and at least one lubrication motor configured to provide power for the at least one lubrication pump, wherein the lubrication pump oil inlet is coupled to the accommodation space of the lubricating oil tank.

In at least some embodiments, the lubrication pump oil inlet of the lubrication pump is directly exposed in the accommodation space of the lubricating oil tank.

In at least some embodiments, a portion of the at least one lubrication pump is immersed in the lubricating oil in the lubricating oil tank.

In at least some embodiments, the lubrication pump oil inlet of the at least one lubrication pump is immersed in the lubricating oil in the lubricating oil tank.

In at least some embodiments, the at least one lubrication module includes at least one transmission device connecting the at least one lubrication motor to the at least one lubrication pump. At least a portion of at least one of the lubrication motor and the lubrication pump is located in the accommodation space. At least a portion of the at least one transmission device is located in the accommodation space.

In at least some embodiments, the accommodation space of the lubricating oil tank is configured for storing lubricating oil, and the at least one lubrication motor is configured to drive the at least one lubrication pump to deliver the lubricating oil to the at least one pump through at least one oil inlet pipeline.

In at least some embodiments, the at least one pump comprises a plunger pump, the plunger pump comprising a hydraulic end and a power end, wherein the power end comprises a power end oil outlet and at least one power end oil inlet. In at least some embodiments, the power end oil outlet is coupled to the accommodation space of the lubricating oil tank through an oil return pipeline, the lubrication pump oil outlet of the at least one lubrication pump is coupled to the at least one power end oil inlet through the at least one oil inlet pipeline.

In at least some embodiments, the at least one heat dissipation module is disposed on the at least one oil inlet pipeline and configured to cool the lubricating oil in the at least one oil inlet pipeline.

In at least some embodiments, the at least one heat dissipation module comprises a first radiator spaced apart from the plunger pump, the first radiator being configured to dissipate heat from the lubricating oil in the at least one oil inlet pipeline.

In at least some embodiments, the first radiator comprises a heat dissipation pipe and a fan, and the fan is configured to blow air to the heat dissipation pipe to dissipate heat.

In at least some embodiments, the fracturing equipment further includes a control system connected to the temperature detector and the at least one lubrication module, and configured to control the at least one lubrication module. The control system is configured to control the at least one lubrication motor to keep on operating when the plunger pump stops operating and the temperature detected by the temperature detector is greater than a first preset value.

In at least some embodiments, the control system is configured to control the plunger pump to stop operating when the temperature detected by the temperature detector is greater than the first preset value and that the alarm sends the alarm.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
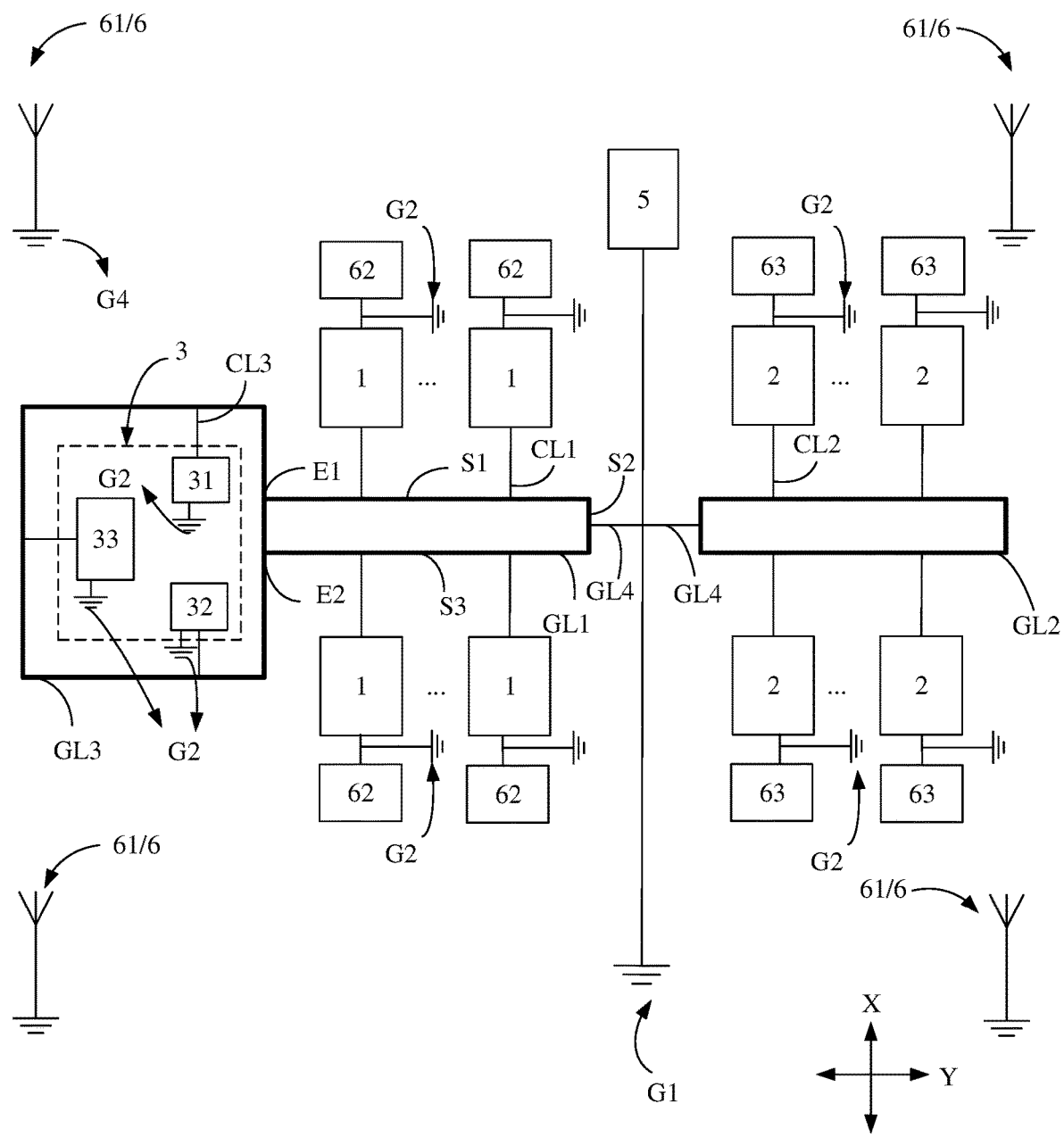
FIG. 1 schematically illustrates a fracturing well site system according to embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. Similarly, the terms "a," or "an," etc., do not mean a quantitative limit, but the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

For example, in the electric-driven fracturing well site system, a fuel-driven apparatus, an electric-driven apparatus and an electric-power supply apparatus are respectively grounded through their own grounding devices to avoid electric shock to person and damage to apparatus and wires. However, many electrical apparatuses are provided in the electric-driven fracturing well site, the electrical apparatuses being grounded one by one is not only troublesome to operate, but also has potential safety problem when the grounding of the electrical apparatus is at a position close to the electrical apparatus itself.

The embodiments of the disclosure provide a fracturing well site system, the fracturing well site system includes an electric-driven apparatus, a fuel-driven apparatus, an electric-power supply apparatus, and a grounding system. The grounding system includes a first grounding terminal, and the first grounding terminal is spaced from each of the electric-driven apparatus, the fuel-driven apparatus and the electric-power supply apparatus by a preset distance. The fuel-driven apparatus and at least one of the electric-driven apparatus and the electric-power supply apparatus are connected to the first grounding terminal, and the first grounding terminal is configured to ground the fuel-driven apparatus and the at least one of the electric-driven apparatus and the electric-power supply apparatus.

In the fracturing well site system according to the embodiments of the present disclosure, by connecting the fuel-driven apparatus and at least one of the electric-driven apparatus and the electric-power supply apparatus to the first grounding terminal, the total number of grounding terminals are reduced, and the workload of grounding operation is reduced. Furthermore, by arranging the first grounding terminal at the preset distance from each of the electric-driven apparatus, the fuel-driven apparatus and the electric-power supply apparatus, leakage current, static charge and the like possibly generated by the above apparatuses are introduced to a position far away from the above apparatuses, thereby further improving the safety of the grounding system and ensuring the normal operation of each apparatus in the well site.

In the embodiments of the present disclosure, connecting the fuel-driven apparatus and at least one of the electric-driven apparatus and the electric-power supply apparatus to the first grounding terminal means that: the fuel-driven apparatus and the at least one of the electric-driven apparatus and the electric-power supply apparatus are connected to the same first grounding terminal. For example, it includes the following three cases: 1) the electric-driven apparatus and the fuel-driven apparatus are connected to the same first grounding terminal; 2) the electric-power supply apparatus and the fuel-driven apparatus are connected to the same first grounding terminal; 3) the electric-driven apparatus, the electric-power supply apparatus and the fuel-driven apparatus are connected to the same first grounding terminal. Please refer to the following detailed description of the three cases.

In the embodiments of the disclosure, the "preset distance" refers to the distance satisfying the safety requirements of the fracturing well site system. For example, the first grounding terminal is provided at a position, of the fracturing well site, far away from electric-driven apparatus, the fuel-driven apparatus and the electric-power supply apparatus, for example, is provided at an edge of the well site. For example, the distance from the first grounding terminal to the electric-driven apparatus is a first distance, the distance from the first grounding terminal to the fuel-driven apparatus is a second distance, the distance from the first grounding terminal to the electric-power supply apparatus is a third distance, and each of the first distance, the second distance and the third distance is greater than or equal to the preset distance.

Generally, the earth has a relatively large resistivity, and different positions of the earth have different potentials if a current flows through the earth. After the current flows into the earth through the grounding terminal, the current spreads from the ground position in a form of current field; the farther away from the grounding position is, the larger the hemispherical current spreading area is, and the smaller the current density in the earth is. Therefore, it is considered that the current density in the earth is close to zero at a position far away from the grounding position, and the potential is already a zero potential at the position far away from the grounding position. Because each of the first distance, the second distance and the third distance is greater than or equal to the preset distance, the leakage current and static charge which are possibly generated by the electric-driven apparatus, the fuel-driven apparatus or the electric-power supply apparatus are led to the remote position of the well site, thereby further improving the safety of the grounding system and ensuring the normal operation of each apparatus in the well site. For example, the preset distance is set to be 50 m~ 5 km; further, for example, 100 m to 1 km.

The disclosure will be explained by several specific examples as follows. In order to keep the following description of the embodiments of the present disclosure clearer and more concise, detailed descriptions of known functions and known components may be omitted. When any component of the embodiments of the present disclosure is illustrated in more than one drawing, the component is denoted by the same reference numeral in each drawing.

FIG. 1 schematically illustrates the fracturing well site system according to the embodiments of the present disclosure. As shown in FIG. 1, the fracturing well site system includes a plurality of electric-driven apparatuses 1, a plurality of fuel-driven apparatuses 2, an electric-power supply apparatus 3, and a grounding system. For example, the grounding system includes a first grounding terminal G1, which is spaced from each of the electric-driven apparatuses 1, the fuel-driven apparatuses 2 and the electric-power supply apparatus 3 by a preset distance. The electric-driven apparatuses 1, the fuel-driven apparatuses 2 and the electric-power supply apparatus 3 for example are connected to the same first grounding terminal G1.

The electric-driven apparatuses 1, the fuel-driven apparatuses 2 and the electric-power supply apparatus 3 are connected to the same first grounding terminal G1, which not only reduces the total number of the grounding terminals and the workload of the grounding operation, but also leads the leakage current and static charge possibly generated by the electric-driven apparatuses 1, the fuel-driven apparatuses 2 and the electric-power supply apparatus 3 to the remote position of the well site, thereby further ensuring the normal operation of each apparatus in the well site.

FIG. 1 illustrates only the case 3) described above. It can be understood that in the embodiments of the present disclosure (referring to FIG. 2 and FIG. 3), the electric-driven apparatuses 1, the fuel-driven apparatuses 2 and the electric-power supply apparatus 3 adopt the grounding manners in cases 1) and 2).

Figure 2:
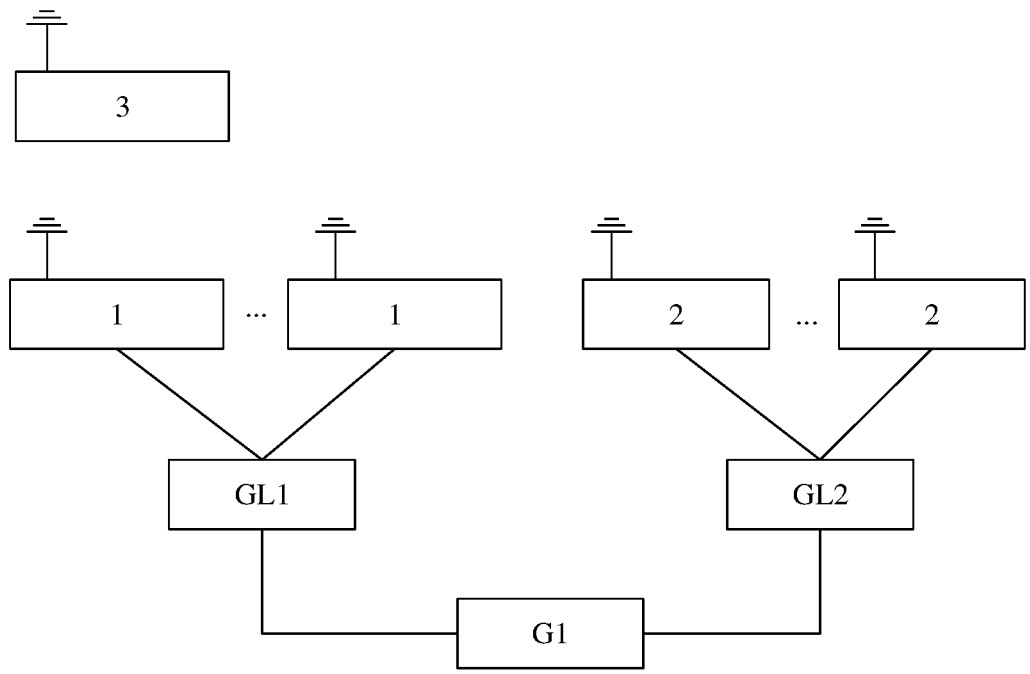
FIG. 2 schematically illustrates a ground system according to the embodiments of the present disclosure.

FIG. 2 schematically illustrates the grounding system according to the embodiments of the present disclosure. For example, as shown in FIG. 2, the fracturing well site system includes the plurality of electric-driven apparatuses 1, the plurality of fuel-driven apparatuses 2, the electric-power supply apparatus 3 and the grounding system. The grounding system includes the first grounding terminal G1. The plurality of electric-driven apparatuses 1 and the plurality of fuel-driven apparatuses 2 are connected to the same first grounding terminal G1. That is to say, the plurality of electric-driven apparatuses 1 and the plurality of fuel-driven apparatuses 2 share the same first grounding terminal G1, which reduces the total number of the grounding terminals used in the well site.

As shown in FIG. 2, the grounding system further includes a first grounding wire GL1 and a second grounding wire GL2. Each of the plurality of electric-driven apparatuses 1 is connected to the first grounding wire GL1 and is connected to the first grounding terminal G1 through the first grounding wire GL1. Each of the plurality of fuel-driven apparatuses 2 is connected to the second grounding wire GL2 and is connected to the first grounding terminal G1 through the second grounding wire GL2. In FIG. 2, by separating the first grounding wire GL1 connected to the electric-driven apparatuses 1 from the second grounding wire GL2 connected to the fuel-driven apparatuses 2, mutual interference between the electric-driven apparatuses 1 and the fuel-driven apparatuses 2 in a fault state is avoided, and the grounding system is more stable. For example, in the case that the first grounding wire GL1 connected with the electric-driven apparatuses 1 breaks down and causes electric leakage, the grounding of the fuel-driven apparatuses 2 is not affected, thereby ensuring the normal operation of the fuel-driven apparatuses 2.

Figure 3:
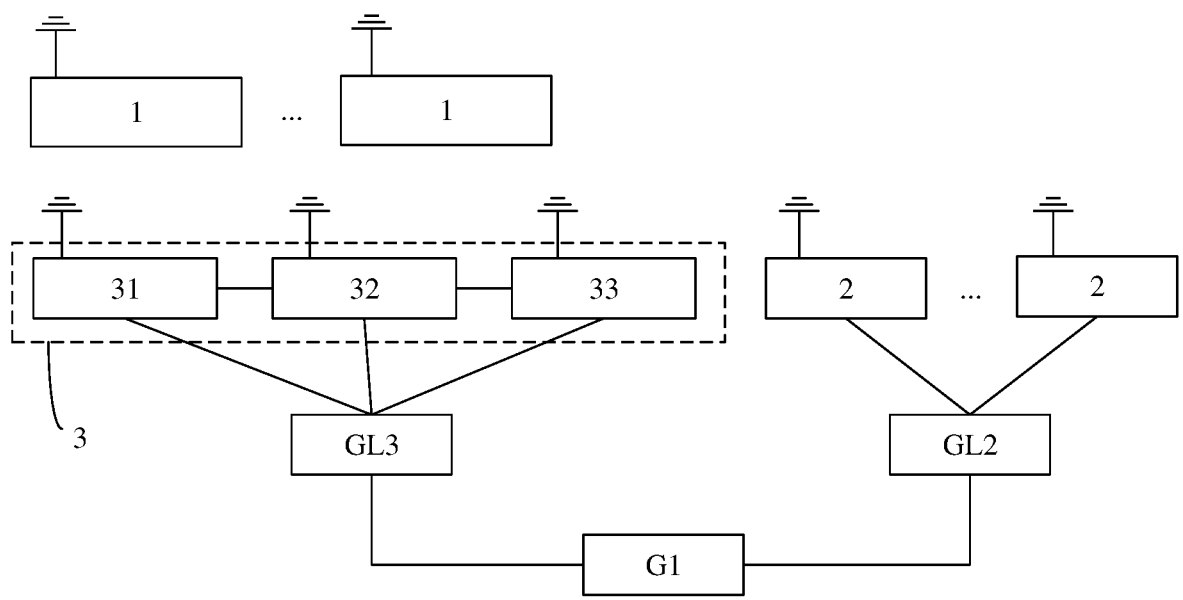
FIG. 3 schematically illustrates another grounding system according to the embodiments of the present disclosure.

FIG. 3 schematically illustrates another grounding system according to the embodiments of the present disclosure. For example, as shown in FIG. 3, the fracturing well site system includes the plurality of electric-driven apparatuses 1, the plurality of fuel-driven apparatuses 2, the electric-power supply apparatus 3 and the grounding system. The grounding system includes the first grounding terminal G1, and the plurality of fuel-driven apparatuses 2 and the electric-power supply apparatuses 3 are connected to the same first grounding terminal G1. For example, the electric-power supply apparatus 3 includes an electric-power supply device P1, an electric-power converter device 32 electrically connected to the electric-power supply device 31, and an electric-power distribution device 33 electrically connected to the electric-power converter device 32. Each of the electric-power supply device 31, the electric-power converter device 32, and the electric-power distribution device 33 and each of the plurality of fuel-driven apparatuses 2 are connected to the same first grounding terminal G1. That is, each of the electric-power supply device 31, the electric-power converter device 32 and the electric-power distribution device 33 and each of the fuel-driven apparatuses 2 share the same first grounding terminal G1, which reduces the total number of the grounding terminals, thereby reducing the difficulty and complexity of the grounding operation.

In FIG. 3, each of the electric-power supply device 31, the electric-power converter device 32, and the electric-power distribution device 33 is connected to the first grounding terminal G1. It can be understood that in other embodiments of the present disclosure, at least one of the electric-power supply device 31, the electric-power converter device 32 and the electric-power distribution device 33 is connected to the first grounding terminal G1; in some embodiments, at least two of the electric-power supply device 31, the electric-power converter device 32 and the electric-power distribution device 33 are connected to the first grounding terminal G1. In the case that each of the electric-power supply device 31, the electric-power converter device 32, and the electric-power distribution device 33 is connected to the first grounding terminal G1, the safety of the whole electric-power supply apparatus is further improved, and thus such case is preferable.

As shown in FIG. 3, the grounding system further includes the second grounding wire GL2 and a third grounding wire GL3. Each of the plurality of fuel-driven apparatuses 2 is connected to the second grounding wire GL2 and is connected to the first grounding terminal G1 through the second grounding wire GL2. Each of the electric-power supply device 31, the electric-power converter device 32 and the electric-power distribution device 33 is connected to the third grounding wire GL3 and is connected to the first grounding terminal G1 through the third grounding wire GL3.

In FIG. 3, each of the electric-power supply device 31, the electric-power converter device 32 and the electric-power distribution device 33 is connected to the first grounding terminal G1 through the third grounding wire GL3. It can be understood that in other embodiments of the disclosure, at least one of the electric-power supply device 31, the electric-power converter device 32 and the electric-power distribution device 33 is connected to the first grounding terminal G1 through the third grounding wire GL3; in some embodiments, at least two of the electric-power supply device 31, the electric-power converter device 32 and the electric-power distribution device 33 are connected to the first grounding terminal G1 through the third grounding wire GL3, so as to achieve the above purpose of the disclosure. In the case that each of the electric-power supply device 31, the electric-power converter device 32 and the electric-power distribution device 33 is connected to the first grounding terminal G1 through the third grounding wire GL3, when any one of the electric-power supply device 31, the electric-power converter device 32 and the electric-power distribution device 33 breaks down (e.g., leaks current), adverse interference to the other two apparatuses is avoided, thereby ensuring the normal operation of the other two apparatuses, and thus such case is preferable.

In the fracturing well site system shown in FIG. 3, the third grounding wire GL3 connected to the electric-power supply apparatus 3 and the second grounding wire GL2 connected to the fuel-driven apparatuses 2 are separated from each other, so that mutual interference between the electric-power supply apparatus 3 and the fuel-driven apparatuses 2 in a fault state is avoided, and the grounding system is more stable. For example, in the case that the third grounding wire GL3 connected to the electric-power supply apparatus 3 breaks down and causes currently leakage, the grounding of the fuel-driven apparatuses 2 are not affected, thereby ensuring the normal operation of the fuel-driven apparatuses 2.

In at least some embodiments, for example, the third grounding wire is configured to surround at least one of the electric-power supply device, the electric-power converter device and the electric-power distribution device, which enhances the grounding protection of the electric-power supply apparatus. For example, the third grounding wire is configured to surround one of the electric-power supply device, the electric-power converter device and the electric-power distribution device, and the other two devices are located outside a region surrounded by the third grounding wire. The fracturing well site usually uses voltage in the order of kilovolts, in this case, by arrange the grounding wire surround at least one of the electric-power supply apparatus, the electric-power converter device and the electric-power distribution device, the leakage current, the static charge or the lightning current which possibly produced by the devices are led into the ground, and person near the devices is prevented from getting the electric shock, thereby further improving the safety of electric-power supply apparatus.

Further, for example, a planar shape of the third grounding wire is a non-closed shape or a closed shape, such as a closed loop shape. The planar shape of the third grounding wire is the closed loop, so that the leakage current, the static charge or the lightning current which possibly generated in all directions around the device are led into the ground, and thereby further improving the safety of electric-power supply apparatus. In the embodiments of the present disclosure, the closed loop for example has any shape, such as a regular shape or an irregular shape. Examples of closed loop include, but are not limited to, rectangle, circle, triangle, oval, polygon and the like, which are not specifically limited by the embodiments of the present disclosure.

Figure 4:
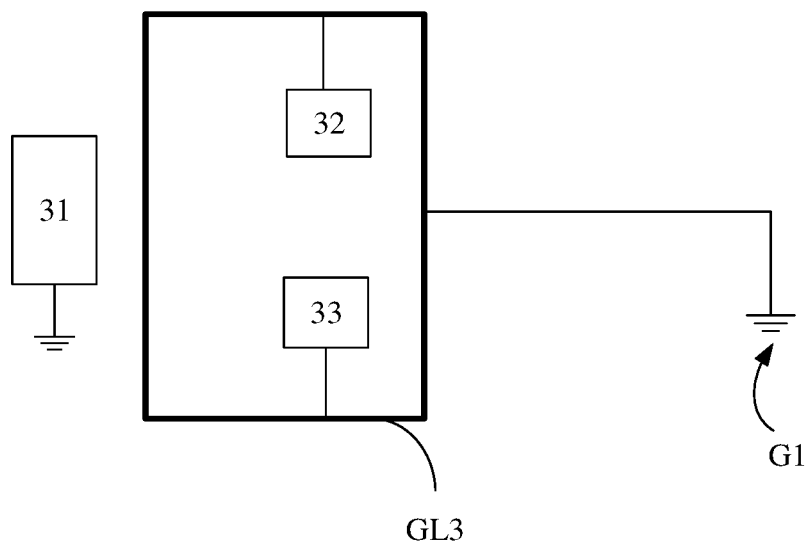
FIG. 4 schematically illustrates a third grounding wire of an electric-power supply apparatus according to the embodiments of the present disclosure.

In at least some embodiments, the third grounding wire is configured to surround at least two of the electric-power supply device, the electric-power converter device and the electric-power distribution device. FIG. 4 schematically illustrates the third grounding wire connected to the electric-power supply apparatus according to the embodiments of the present disclosure. For example, as shown in FIG. 4, the third grounding wire GL3 surrounds the electric-power converter device 32 and the electric-power distribution device 33 to form the closed loop. The electric-power converter device 32 and the electric-power distribution device 33 are connected to the first grounding terminal G1 through the third grounding wire GL3. The electric-power supply device 31 is located outside the region surrounded by the closed loop and adopts a separate grounding terminal. In this case, the third grounding wire GL3 surrounds the electric-power converter device 32 and the electric-power distribution device 33, so that the leakage current, the static charge, the lightning current and the like, which possibly generated by the electric-power converter device 32 and the electric-power distribution device 33, are introduced into the ground to further improve the safety of electric-power supply apparatus. In addition, the electric-power converter device 32 and the electric-power distribution device 33 are connected to the same third grounding wire GL3, the total number of the grounding wires are reduced, and the workload of the well site operation is reduced. Furthermore, the electric-power supply device 31 uses the grounding terminal different from the grounding terminal G1 used by the electric-power converter device 32 and the electric-power distribution device 33, so that grounding interference between the electric-power supply device 31 and each of the electric-power converter device 32 and the electric-power distribution device 33 is avoided.

In at least some embodiments, the third grounding wire is configured to surround the three devices, that is, the electric-power supply device, the electric-power converter device and the electric-power distribution device. For example, as shown in FIG. 1, the third grounding wire GL3 extends along a periphery of the electric-power supply device 31, the electric-power converter device 32, and the electric-power distribution device 33 to form the closed loop. The third grounding wire GL3 is connected to the first grounding terminal G1. Because the third grounding wire GL3 surrounds the electric-power supply device 31, the electric-power converter device 32 and the electric-power distribution device 33, the leakage current, the static charge or the lightning current, which possibly generated in all directions by these three devices, are introduced into the ground, and the safety of electric-power supply apparatus is further improved. In addition, because the electric-power supply device 31, the electric-power converter device 32 and the electric-power distribution device 33 are connected to the same third grounding wire GL3 and the same grounding terminal G1, the total number of the grounding wires and grounding terminals are reduced, and the workload of well site operation is reduced.

Returning to FIG. 1, the fracturing well site system includes the plurality of electric-driven apparatuses 1, the plurality of fuel-driven apparatuses 2 and the electric-power supply apparatus 3. The electric-power supply apparatus 3 includes the electric-power supply device 31, the electric-power converter device 32 electrically connected to the electric-power supply device 31, and the electric-power distribution device 33 electrically connected to the electric-power converter device 32. The grounding system includes the first grounding wire GL1, the second grounding wire GL2, and the third grounding wire GL3. Each of the electric-driven apparatuses 1 is connected to the first grounding wire GL1 and is connected to the first grounding terminal G1 through the first grounding wire GL1. Each of the fuel-driven apparatuses 2 is connected to the second grounding wire GL2 and is connected to the first grounding terminal G1 through the second grounding wire GL2. The electric-power supply device 31, the electric-power converter device 32, and the electric-power distribution device 33 are connected to the third grounding wire GL3 and are connected to the first grounding terminal G1 through the third grounding wire GL3. Compared with the case where each apparatus is connected to its own grounding terminal, the fracturing well site system according to the embodiments of the disclosure includes the first grounding wire GL1, the second grounding wire GL2 and the third grounding wire GL3, on one hand, the total number of the grounding terminals are reduced and the workload of the grounding operation is reduced; on the other hand, if one of the grounding wires fails due to breakage, the grounding effect of other grounding wires are not affected, thereby ensuring the normal operation of the plurality of apparatuses connected with other grounding wires.

For example, as shown in FIG. 1, the grounding system further includes a plurality of second grounding terminals G2. The plurality of second grounding terminals G2 are directly connected with the electric-driven apparatus 1, the fuel-driven apparatus 2 and the electric-power supply apparatus 3, respectively, and are configured to ground each of the electric-driven apparatus 1, the fuel-driven apparatus 2 and the electric-power supply apparatus 3. For example, taking the electric-driven apparatus 1 as an example, the electric-driven apparatus 1 is provided with a connection wire CL1. For example, a proximal end of the connection wire CL1 is fixedly connected with the electric-driven apparatus 1, and a distal end of the connection wire CL1 is connected with the second grounding terminal G2. The second grounding terminal G2 for example is buried under the ground around the electric-driven apparatus 1 to realize grounding. Through the connection wire CL1, the leakage current or static charge generated by the electric-driven apparatus 1 is led to the second grounding terminal G2. In this way, the electric-driven apparatus 1 is grounded not only through the first grounding terminal G1, but also through the second grounding terminal G2, so that double grounding protection of the electric-driven apparatus 1 is achieved, which further improves the safety and reliability of the electric-driven apparatus 1. Similarly, the fuel-driven apparatus 2 for example is connected to the second grounding terminal G2 through a connection wire CL2. Each of the electric-power supply device 31, the electric-power converter device 32, and the electric-power distribution device 33 of the electric-power supply apparatus 3 is connected to the third grounding terminal G3 through a connection wire CL3.

In the embodiments of the present disclosure, the electric-driven apparatus 1, the fuel-driven apparatus 2 and the electric-power supply apparatus 3 for example adopt a skid-mounted mode or a trailer mode; and different modes may result in that the connection mode between the apparatus and the second grounding terminal is various. For example, taking the electric-driven apparatus 1 as an example, the electric-driven apparatus 1 for example adopts the skid-mounted mode and is fixed on a base of the skid-mounted frame, at this time, the proximal end of the connection wire CL1 is connected to the base of the skid-mounted frame, and the distal end of the connection wire CL1 is connected to the second grounding terminal G2. For example, the electric-driven apparatus 1 adopts the trailer mode, the electric-driven apparatus 1 is movable at any time, at this time, the proximal end of the connection wire CL1 is directly connected to a housing of the electric-driven apparatus 1, and the distal end of the connection wire CL1 is connected to the second grounding terminal G2. Those skilled in the art may select one of the above two connection modes according to actual needs, which is not limited by the embodiments of the present disclosure.

In FIG. 1, each of the electric-driven apparatus 1, the fuel-driven apparatus 2, the electric-power supply device 31, the electric-power converter device 32 and the electric-power distribution device 33 is connected with the corresponding second grounding terminal G2. It can be understood that in other embodiments of the present disclosure, one or more apparatuses among the above apparatuses are selected to be connected with the second grounding terminal according to actual needs. The embodiments of the present disclosure do not limit the total number of the apparatuses that are connected with the second grounding terminal G2.

With continued reference to FIG. 1, for example, the plurality of electric-driven apparatuses 1 are provided in two rows spaced apart from each other in a first direction X (i.e. upper and lower rows of electric-driven apparatuses shown in the figure). Each row of electric-driven apparatuses includes at least two electric-driven apparatuses 1, and the at least two electric-driven apparatuses 1 are provided in the second direction Y. The first direction X and the second direction Y are perpendicular to each other. For example, the plurality of fuel-driven apparatuses 2 are provided in two rows spaced apart from each other in the first direction X (i.e. upper and lower rows of fuel-driven apparatuses shown in the figure). Each row of fuel-driven apparatuses includes at least two fuel-driven apparatuses 2 provided in the second direction Y.

For example, the first grounding wire GL1 is located between the two rows of electric-driven apparatuses in the first direction X. For example, the second grounding wire GL2 is located between the two rows of fuel-driven apparatuses in the first direction X. For example, the first grounding terminal G1 is located between the first grounding wire GL1 and the second grounding wire GL2 in the second direction Y. By adopting the above layout of the apparatuses and grounding wires, on one hand, the first grounding wire GL1 and the second grounding wire GL2 don't cross each other, thereby avoiding the interference between the two grounding wires; on the other hand, an amount of the material for forming the grounding wires is reduced, which reduces the cost of the grounding system of the well site system on the premise of ensuring safety, and improves the space occupancy of the well site system.

In FIG. 1, the plurality of electric-driven apparatuses are provided in two rows and the plurality of fuel-driven apparatuses are provided in two rows; it can be understood that in other embodiments of the present disclosure, the plurality of electric-driven apparatuses or the plurality of fuel-driven apparatuses for example are provided in two rows or more than two rows, which is not limited by the embodiments of the present disclosure.

In addition, the embodiments of the present disclosure do not limit the type of the apparatus in each row. For example, taking electric-driven apparatus as an example, each row of electric-driven apparatus for example includes the same kind of electric-driven apparatus (such as an electric-driven fracturing apparatus), or different kinds of electric-driven apparatus (such as the combination of the electric-driven fracturing apparatus and a frequency conversion apparatus and the like).

In the embodiments of the disclosure, the electric-driven apparatus includes one or more of a frequency conversion apparatus, an electric-driven fracturing apparatus, an electric-driven sand mixing apparatus, an electric-driven sand transportation apparatus, an electric-driven meter, an electric-driven chemical additive apparatus and an electric-driven proppant apparatus. For example, the fuel-driven apparatus includes the apparatus driven by fuel, including but not limited to a diesel-driven apparatus. For example, the diesel-driven apparatus includes one or more of a diesel-driven fracturing apparatus, a diesel-driven sand mixing apparatus and a diesel-driven mixing apparatus.

In at least some embodiments, each of the first grounding wire GL1, the second grounding wire GL2, and the third grounding wire GL3 comprises a plurality of portions. The following description will take the first grounding wire GL1 as an example.

For example, as shown in FIG. 1, the first grounding wire GL1 includes a first portion S1, a second portion S2, and a third portion S3. The first portion S1 and the third portion S3 are provided opposite to each other in the first direction X. The second portion S2 is located between first portion S1 and third portion S3 in the first direction X. For example, the first portion S1, the second portion S2 and the third portion S3 form a U-shape. In the case where the electric-driven apparatuses 1 are provided in two rows, one row of electric-driven apparatuses (for example, the upper row of electric-driven apparatuses shown in the figure) is connected to the first portion S1, the other row of electric-driven apparatuses (for example, the lower row of electric-driven apparatuses shown in the figure) is connected to the third portion S3, and the second portion S2 is connected to the first grounding terminal G1. In the case that the upper row of electric-driven apparatuses are connected to the first portion S1 and the lower row of electric-driven apparatuses are connected to the third portion S3, if one of the first portion S1 and the third portion S3, such as the first portion S1, fails due to the wire breakage, the grounding effect of the third portion S3 is not affected, thereby ensuring the grounding safety of the lower row of electric-driven apparatuses.

In at least some embodiments, the third grounding wire GL3 is directly connected with the first grounding terminal G1, or is connected with the first grounding terminal G1 through other grounding wire. For example, as shown in FIG. 1, the electric-power supply apparatus 3 is disposed on a side of the first grounding wire GL1 away from the second grounding wire GL2, and the third grounding wire GL3 is connected with the first grounding terminal G1 through the first grounding wire GL1. Further, for example, the third grounding wire GL3 is connected to two ends of the first grounding wire GL1, that is, a first end E1 and a second end E2 of the first grounding wire GL1. By adopting the above arrangement, a connection wire from the third grounding wire GL3 to the first grounding terminal G1 is omitted, the amount of the material for forming the grounding wire is reduced, and the cost of the grounding system of the well site is reduced on the premise of ensuring safety.

In at least some embodiments, for example, each of the first grounding wire GL1, the second grounding wire GL2, and the third grounding wire GL3 is disposed on the ground has a flat-shaped portion made from a conductive material. For example, each of the first grounding wire GL1, the second grounding wire GL2, and the third grounding wire GL3 which is made of the conductive material is wrapped by an insulating material. The following description will take the first grounding wire GL1 as an example.

Figure 5:
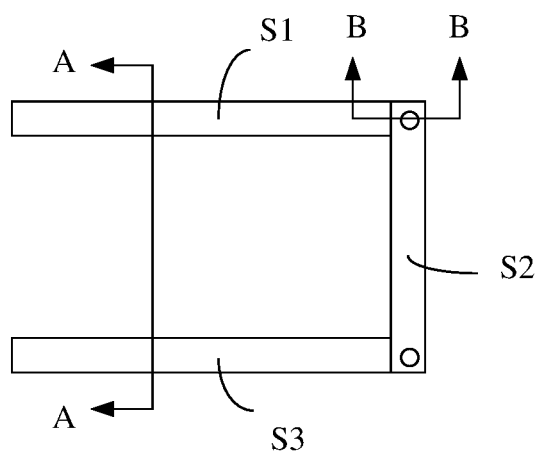
FIG. 5 schematically illustrates a grounding wire according to the embodiments of the present disclosure.
Figure 6:
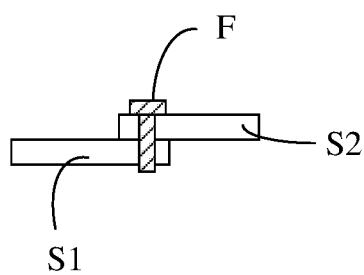
FIG. 6 is a cross-sectional view taken along a line BB of FIG. 5.
Figure 7:
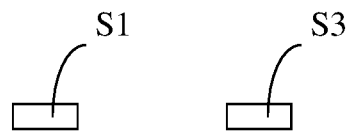
FIG. 7 is a cross-sectional view taken along a line AA of FIG. 5.

FIG. 5 schematically illustrates the grounding wire according to the embodiments of the present disclosure. FIG. 6 is a cross-sectional view taken along the line BB of FIG. 5. FIG. 7 is a cross-sectional view taken along the line AA of FIG. 5.

For example, as shown in FIGS. 5 to 7, the first grounding wire GL1 includes a plurality of flat-shaped portions. For example, each of the first portion S1, the second portion S2 and the third portion S3 comprises a piece of flat-shaped steel, and the plurality of pieces of flat-shaped steel are connected with each other by welding or fasteners F. The fastener F for example is a galvanized bolt. The flat-shaped portion is made from the conductive material such as a metal material. In order to reduce the resistance of the grounding system, the flat-shaped portion is preferably made from flat-shaped galvanized steel or flat-shaped galvanized iron. The cross section of the flat-shaped portion is, for example, rectangular. Considering that the flat-shaped portion should bear a short-circuit current for a certain time in a short-circuit state, a width of the flat-shaped portion is, for example, from 30 mm to 50 mm, preferably 40 mm. A thickness of the flat-shaped portion is from 3 mm to 5 mm, preferably 4 mm.

Returning to FIG. 1, the first grounding wire GL1 and the second grounding wire GL2 for example are connected to the first grounding terminal G1 through a connection wire CL4. In the embodiments of the present disclosure, for example, each of the connection wires CL1, CL2, CL3, CL4 includes an equipotential connection wire. Equipotential connection equalizes potential and reduce contact voltage by proving the equipotential connection wire without adding protective appliances to eliminate the risk of electric shock caused by potential difference, and the equipotential connection is economical and effectively prevents electric shock. For example, the equipotential connection wire includes a metal-core cable, such as a copper-core cable. For example, a diameter of the equipotential connection wire is from 5 mm to 15 mm, preferably 10 mm.

For example, as shown in FIG. 1, the fracturing well site system further includes an auxiliary electric-driven apparatus 5, which is connected to the first grounding terminal G1, and the first grounding terminal G1 is further configured to ground the auxiliary electric-driven apparatus 5. The auxiliary electric-driven apparatus 5 includes other electric power consumption apparatus used in the well site, such as a lighting apparatus and a water pump. By connecting the auxiliary electric-driven apparatus 5 to the first grounding terminal G1 in the well site, it is unnecessary to separately provide a grounding terminal for the auxiliary electric-driven apparatus 5, thereby reducing the total number of the grounding terminals used in the well site and reducing the workload of the grounding operation.

Figure 8:
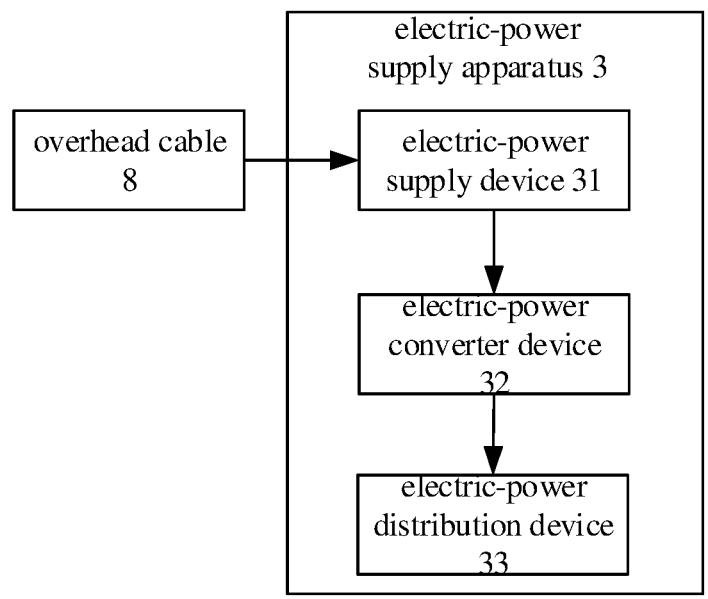
FIG. 8 schematically illustrates a connection relationship between an overhead cable and the electric-power supply apparatus according to the embodiments of the present disclosure.
Figure 9:
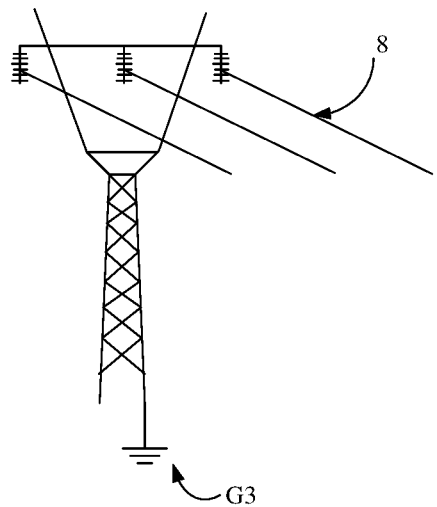
FIG. 9 schematically illustrates the overhead cable according to the embodiments of the present disclosure.
Figure 10:
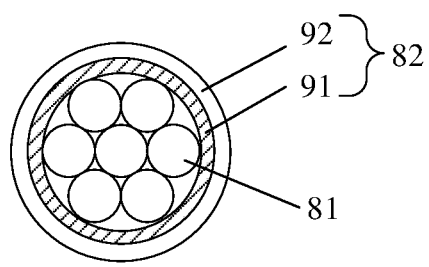
FIG. 10 schematically illustrates an exemplary structure of the overhead cable according to the embodiments of the present disclosure.

FIG. 8 schematically illustrates a connection relationship between an overhead cable and the electric-power supply apparatus according to the embodiments of the present disclosure. FIG. 9 schematically illustrates the overhead cable according to the embodiments of the present disclosure. FIG. 10 schematically illustrates an exemplary structure of the overhead cable according to the embodiments of the present disclosure.

For example, as shown in FIGS. 8 to 10, the fracturing well site system further includes an overhead cable 8, the overhead cable 8 is connected with the electric-power supply apparatus 3 and configured to supply power to the electric-power supply apparatus 3. The overhead cable 8 includes a conductive core 81 and a protective layer 82 wrapping the conductive core 81. For example, the protective layer 82 includes a shielding layer 91 close to the conductive core 81 and an insulating layer 92 far away from the conductive core 81. For example, the shielding layer 91 prevents the conductive core 81 from radiating electromagnetic energy outwardly and reduces the influence of an external electric field or magnetic field on the conductive wire core 81. For example, the shielding layer 91 comprises a metal mesh.

As shown in FIG. 9, the grounding system further includes a third grounding terminal G3, the third grounding terminal G3 is connected to the shielding layer 91 of the overhead cable 8 and configured to ground the shielding layer 91 of the overhead cable 8. The above-mentioned third grounding terminal G3 is spaced apart from the first grounding terminal G1 and the second grounding terminal G2, that is, the first grounding terminal G1, the second grounding terminal G2 and the third grounding terminal G3 are not connected with each other; in this way, in the case that one of the three grounding terminal fails, the grounding effect of other grounding terminals is not affected, and the normal operation of the apparatus or device connected to other grounding terminals is ensured.

Returning to FIG. 1, the fracturing well site system further includes a lightning protection apparatus 6, the lightning protection apparatus 6 includes a main lightning protection apparatus 61, and the main lightning protection apparatus 61 is provided at a corner of the well site. As shown in FIG. 1, the main lightning protection apparatus 61 is provided at each of four corners of the well site. The main lightning protection apparatus 61 is preferably a lightning receptor apparatus for preventing direct lightning. The main lightning protection apparatus has an individual grounding component. For example, the grounding system includes a fourth grounding terminal G4 connected with the main lightning protection apparatus 61 and configured to ground the main lightning protection apparatus 61, and the fourth grounding terminal G4 is not connected with the first grounding terminal G1. Under lightning strikes, a current flows through the main lightning protection apparatus 61; in this case, because the main lightning protection apparatus 61 has the individual grounding terminal, other grounding terminals or grounding apparatuses are not affected.

In at least some embodiments, the lightning protection apparatus further comprises an auxiliary lightning protection apparatus provided on at least one of the electric-driven apparatus, the fuel-driven apparatus and the electric-power supply apparatus. For example, as shown in FIG. 1, the auxiliary lightning protection apparatus 62 is mounted on each of the electric-driven apparatuses 1, and the auxiliary lightning protection apparatus 63 is mounted on each of the fuel-driven apparatuses 2. Each of the auxiliary lightning protection apparatuses 62, 63 for example includes one or more of the "TM-CPD (Countcurrent Protective Device)", the lightning receptor apparatus and the surge protector. Different from the normal way of introducing the lightning current to the earth for lightning protection, the TM-CPD adopts the way of "upper neutralization and lower blocking", which prevents lightning from entering downwardly into the protection area to be protected, so that direct lightning does not fall into the area to be protected. The technical advantages of the TM-CPD are as follows: 1) the direct lightning does not fall into the area to be protected, and the TM-CPD is not the device of leading the direct lightning to the earth; 2) no electric-power is needed and no secondary problems are generated; 3) the grounding resistance is low, which is not more than 300Ω (ohm), for example the grounding resistance is 4Ω.

In FIG. 1, only the electric-driven apparatus 1 and the fuel-driven apparatus 2 are provided with the auxiliary lightning protection apparatus 62 and 63; it can be understood that the auxiliary lightning protection apparatus for example is also mounted on each of the electric-power supply device 31, the electric-power converter device 32 and the electric-power distribution device 33, and the embodiments of the present disclosure do not limit the arrangement mode of the auxiliary lightning protection apparatus.

As shown in FIG. 1, the auxiliary lightning protection apparatus 62 is grounded through the second grounding terminal G2 directly connected to the electric-driven apparatus 1. That is, the auxiliary lightning protection apparatus 62 and the electric-driven apparatus 1 are connected to the same second grounding terminal G2. Because the auxiliary lightning protection apparatus 62 does not need a separate grounding terminal, the total number of the grounding terminals is reduced, and the workload of the grounding operation is reduced. Similarly, the auxiliary lightning protection apparatus 63 and the fuel-driven apparatus 2 are connected to the same second grounding terminal G2.

In at least some embodiments, a height of the auxiliary lightning protection apparatuses 62, 63 relative to the ground is lower than a height of the main lightning protection apparatus 61 relative to the ground. When the lightning strikes, due to the higher height of the main lightning protection apparatus 61, the current generated by lightning is firstly introduced into the ground through the main lightning protection apparatus 61, thereby avoiding the impact of lightning on the auxiliary lightning protection apparatuses 62 and 63.

In the embodiments of the present disclosure, the first grounding terminal G1, the second grounding terminal G2, the third grounding terminal G3 and the fourth grounding terminal G4 are buried under the ground and made from the conductive material, and the conductive material is coated with an anti-corrosion coating. The following description will take the first grounding terminal G1 as an example.

Figure 11:
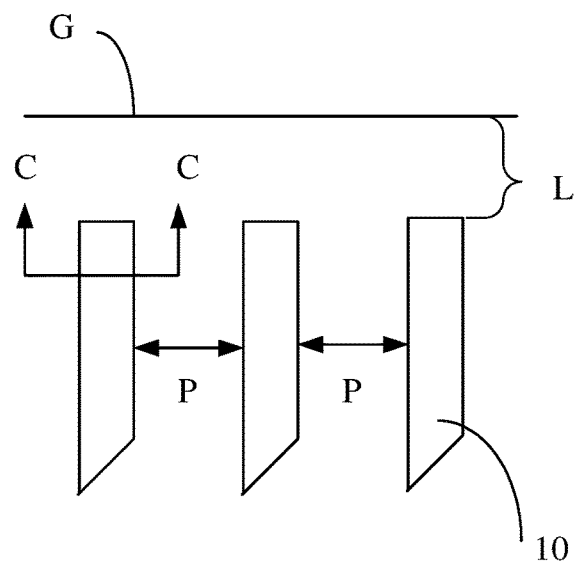
FIG. 11 schematically illustrates a first ground terminal according to the embodiments of the present disclosure.
Figure 12:
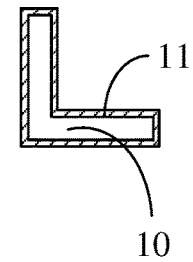
FIG. 12 is a cross-sectional view taken along a line CC of FIG. 11.

FIG. 11 schematically illustrates the first grounding terminal according to the embodiments of the present disclosure. FIG. 12 is a cross-sectional view taken along the CC line of FIG. 11.

For example, as shown in FIG. 11, the first grounding terminal G1 includes a grounding body 10 buried under the ground G. For example, the grounding body 10 adopts a 50 mm×50 mm×5 mm angle steel and is buried under the ground G in the vertical direction. The embodiments of the present disclosure do not specifically limit the total number of the grounding bodies 10, for example, the total number of the grounding bodies 10 is one or more. In the case that the grounding resistance does not meet the requirements of the well site, the total number of the grounding bodies are increased to reduce the resistance of the grounding resistance. For example, three grounding bodies 10 are provided at an equal interval. For example, a distance between any two adjacent grounding bodies 10 is equal to or greater than twice of a length of each of the grounding bodies 10. For example, the length of the grounding body 10 is 1.5 m, and the distance P between two adjacent grounding bodies 10 is 4 m-6 m, preferably 5 m. The buried depth of the top surface of grounding body (i.e. a distance from the ground G to the top surface of grounding body) should meet the design requirements. For example, the buried depth L of the top surface of the grounding body 10 is equal to or greater than 0.6 m, for example, 0.6 m to 1.2 m.

For example, as shown in FIG. 12, in order to prevent the surface of the grounding body 10 from being corroded, the surface of the grounding body 10 needs to undergo anti-corrosion treatment, for example, the surface of the grounding body 10 is coated with the anti-corrosion coating 11.

Figure 13:
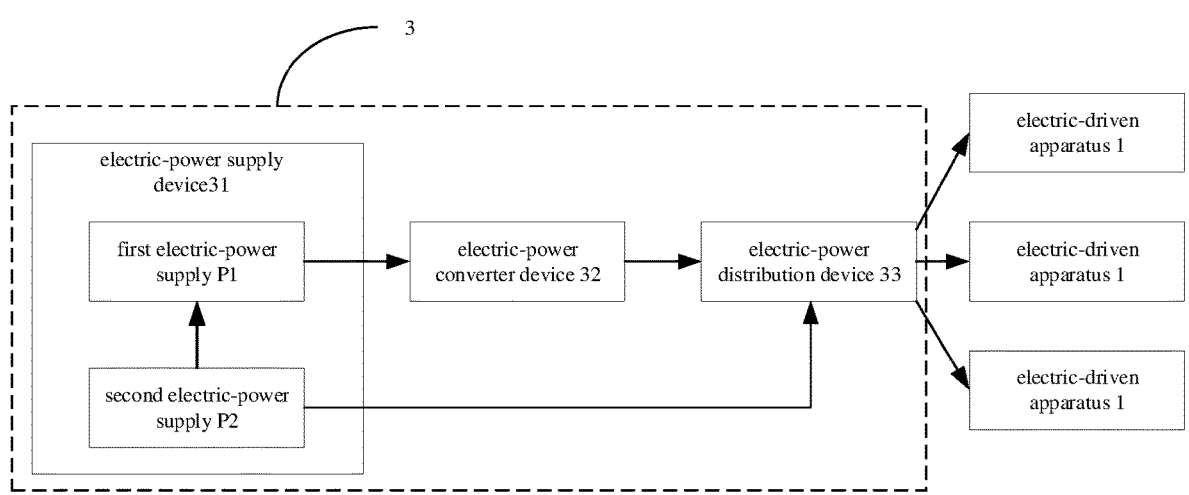
FIG. 13 schematically illustrates a connection relationship between the electric-power supply apparatus and an electric-driven apparatus according to the embodiments of the present disclosure.

FIG. 13 schematically illustrates a connection relationship between the electric-power supply apparatus and the electric-driven apparatus according to the embodiments of the present disclosure. For example, as shown in FIG. 13, the electric-power supply apparatus 3 includes the electric-power supply device 31, the electric-power converter device 32, and the electric-power distribution device 33. The electric-power supply device 31 includes a first electric-power supply P1 and a second electric-power supply P2. The first electric-power supply P1 is configured to provide a first voltage; the second electric-power supply P2 is configured to provide a second voltage. For example, both the first voltage and the second voltage are in the order of kilovolts, and the first voltage is higher than the second voltage. In actual production, the first voltage is not lower than 35 kv, and the second voltage is not lower than 10 kv.

In the embodiments of the present disclosure, the first electric-power supply P1 and the second electric-power supply P2 for example are connected to an external electric-power supply apparatus (such as the overhead cable). In some embodiments, the first electric-power supply P1 and the second electric-power supply P2 are a local electric-generator system or an electric-storage apparatus. The electric-generator for example is a gas turbine electric-generator or a diesel electric-generator. The electric-storage apparatus for example comprises a super-capacitor or other electric-storage elements.

As shown in FIG. 13, the first electric-power supply P1 is configured to transmit the first voltage to the electric-power converter device 32. The electric-power converter device 32 is electrically connected to the first electric-power supply P1. The electric-power converter device 32 is configured to compare the first voltage with a preset voltage, adjust the first voltage according to the comparison result, and transmit the first voltage after being adjusted to the electric-power distribution device 33. The electric-power distribution device 33 is electrically connected to the electric-power converter device 32 and is configured to distribute the electric-power to the plurality of electric-driven apparatuses 1.

For example, the first voltage provided by the first electric-power supply P1 is 35 kv and the power is 5 MVA. After the first voltage is input to the electric-power converter device 32, the electric-power converter device 32 compares the first voltage with the preset voltage (e.g., 10 kv). Because the first voltage is higher than the preset voltage, the electric-power converter device 32 converts the first voltage into 10 kv voltage, so that the high-voltage side voltage of the electric-power converter device 32 is 35 kv, the low-voltage side voltage of the electric-power converter device 32 is 10 kv, and the power is not less than 5 MVA. Subsequently, the electric-power converter device 32 transmits the first voltage after being adjusted to the electric-power distribution device 33. The electric-power distribution device 33 distributes the 10 kv voltage to the electric-driven apparatus at the well site. For example, the electric-power distribution device 33 adopts the mode of one input wire in combination with multiple output wires, and the power of each output wire is not less than 3 MVA.

As shown in FIG. 13, the electric-power distribution device 33 is further directly electrically connected to the second electric-power supply P2. The electric-power distribution device 33 is further configured to distribute the second voltage provided by the second electric-power supply P2 to the plurality of electric-driven apparatuses 1. For example, the second voltage provided by the second electric-power supply P2 is 10 kv; in this case, the second voltage is not needed to be converted before being input to the second electric-power supply P2, thereby reducing the total number of the electric-power converter devices.

In FIG. 13, it is shown that the electric-power supply device 31 includes the first electric-power supply P1 and the second electric-power supply P2; it can be understood that in other embodiments of the present disclosure, the electric-power supply device 31 for example only includes the first electric-power supply P1 or the second electric-power supply P2. In addition, the respective numbers of the first electric-power supply P1 and the second electric-power supply P2 are not limited to one, but may be two or more, which are selected by those skilled in the art according to actual requirements, and the embodiments of the present disclosure do not limit this.

In some embodiment, the second electric-power supply P2 is connected and supply power to the first electric-power supply P1.

In some embodiments, the electric-power supply apparatus is configured to power the electric-driven apparatus(es). For example, the electric-driven apparatus(es) may include at least one motor, at least one lubrication module, and at least one heat dissipation module. In one instance, the at least one motor is powered by the first electric-power supply P1 while the at least one lubrication module and the at least one heat dissipation module are powered by at least one of the first electric-power supply P1 or the second electric-power supply P2.

Figure 14:
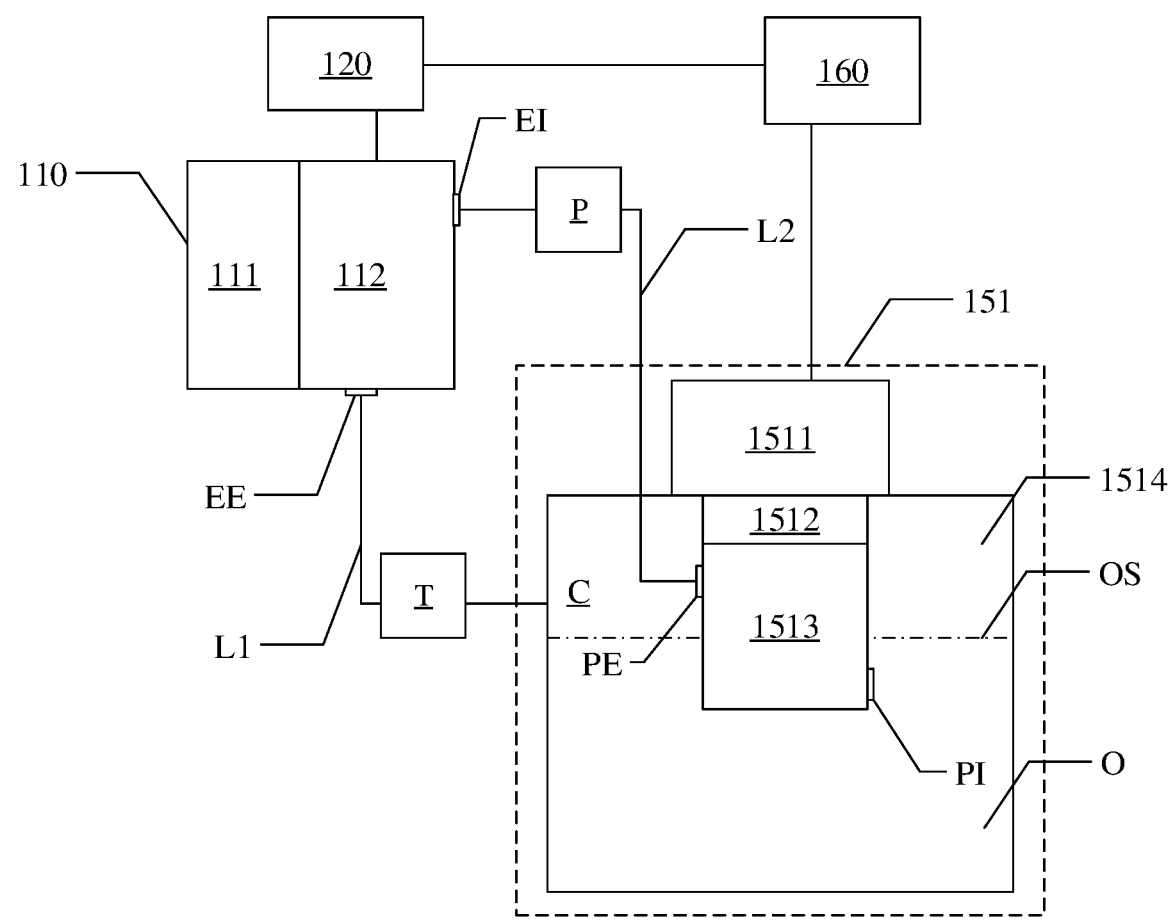
FIG. 14 is a schematic block diagram of a fracturing apparatus including at least one lubrication module according to an embodiment of the present disclosure.

FIG. 14 is a schematic block diagram of a fracturing apparatus including at least one lubrication module according to an embodiment of the present disclosure.

Referring to FIG. 14, the fracturing apparatus includes a plunger pump 110 and a power end lubricating system 151. The plunger pump 110 includes a hydraulic end 111 and a power end 112. The power end 112 has a power end oil outlet EE and a power end oil inlet E1 that are coupled to each other. For example, to be coupled to each other, EE and E1 are connected directly or indirectly such that a fluid may flow from EE to E1 or from E1 to EE.

The power end lubricating system 151 includes a lubricating oil tank 1514, a lubrication pump 1513, and a lubrication motor 1511.

The lubricating oil tank 1514 defines an accommodation space C.

The lubrication pump 1513 has a lubrication pump oil inlet P1 and a lubrication pump oil outlet PE that are coupled to each other.

The lubrication motor 1511 provides power for the lubrication pump 1513. The lubrication pump oil inlet P1 is coupled to the accommodation space C, and the power end oil outlet EE is coupled to the accommodation space C of the lubricating oil tank 1514 through an oil return pipeline L1. The lubrication pump oil outlet PE of the lubrication pump 1513 is coupled to the power end oil inlet E1 through an oil inlet pipeline L2.

In the example shown in FIG. 14, the lubrication motor 1511 is located outside the accommodation space C of the lubricating oil tank 1514, and the lubrication pump 1513 is located in the accommodation space.

In another example, the lubrication motor 1511 and the lubrication pump 1513 are completely located in the accommodation space C of the lubricating oil tank 1514.

In still another example, a portion of the lubrication motor 1511 and the entire lubrication pump 1513 are located in the accommodation space C of the lubricating oil tank 1514.

In still another example, a portion of the lubrication motor 1511 and a portion of the lubrication pump 1513 are located in the accommodation space C of the lubricating oil tank 1514.

In other words, at least a portion of at least one of the lubrication motor 1511 and the lubrication pump 1513 is located in the accommodation space.

With this configuration, the lubricating oil tank 1514 impedes the propagation of noise produced during the working process of at least one of the lubrication motor 1511 and the lubrication pump 1513 that are at least partially located in the lubricating oil tank, thereby realizing noise reduction during the working process of the power end lubricating system 151.

Referring continuously to FIG. 14, the lubrication pump oil inlet P1 of the lubrication pump 1513 is directly exposed in the accommodation space C of the lubricating oil tank 1514. In other words, the coupling between the lubrication pump oil inlet P1 of the lubrication pump 1513 and the accommodation space C of the lubricating oil tank 1514 does not rely on any pipeline.

The power end lubricating system 151 for example further includes a transmission device 1512 for connecting the lubrication motor 1511 to the lubrication pump 1513. In the example shown in FIG. 14, the transmission device 1512 is completely located in the accommodation space C of the lubricating oil tank 1514. In another example, the transmission device 1512 is partially located in the accommodation space C of the lubricating oil tank 1514 or completely located outside the accommodation space C of the lubricating oil tank 1514.

The transmission device 1512 in FIG. 14 may be omitted. In other words, the lubrication motor 1511 and the lubrication pump 1513 may be directly connected to each other.

For example, the accommodation space C of the lubricating oil tank 1514 accommodates a lubricating oil O therein. The lubrication motor 1511 is configured to drive the lubrication pump 1513 to deliver the lubricating oil O to the power end via at least one oil inlet pipeline.

For example, at least a portion of the lubrication pump 1513 is immersed in the lubricating oil O. With this configuration, the lubricating oil O in the lubricating oil tank 1514 further impedes the propagation of noise during the working process of the lubrication pump 1513, thereby further reducing the noise during the working process of the power end lubricating system 151.

For example, the lubrication pump oil inlet P1 of the lubrication pump 1513 is completely immersed in the lubricating oil O. In other words, the lubrication pump oil inlet P1 of the lubrication pump 1513 is completely located below a surface OS of the lubricating oil O. With this configuration, the lubricating oil can enter the lubrication pump 1513 directly through the lubrication pump oil inlet P1 of the lubrication pump 1513 and be pumped out from the lubrication pump oil outlet PE of the lubrication pump 1513. In this way, an oil pipeline for connecting the lubrication pump oil inlet P1 with the lubricating oil in the accommodation space C of the lubricating oil tank 1514 can be obviated.

The embodiments of the present disclosure have no particular limitation on whether oil suction pipeline is connected to the lubrication pump oil inlet P1 of the lubrication pump 1513. In another example, an end of the oil suction pipeline (not shown) is connected to the lubrication pump oil inlet P1 of the lubrication pump 1513, and the other end of the oil suction pipeline opposite to the end extends into the lubricating oil O. The oil suction pipeline may be located completely or partially in the accommodation space C of the lubricating oil tank 1514.

Referring to FIG. 14, the fracturing apparatus according to the embodiment of the present disclosure further includes a prime mover 120 and a control system 160.

The prime mover 120 is connected to the power end 112 of the plunger pump 110 and configured to provide power for the power end 112.

The control system 160 is connected to the prime mover 120 and the power end lubricating system 151. The connection between the control system 160 and various devices may be realized in a wire or wireless communication mode. In FIG. 14, the connections between the control system 160 and various devices are not all shown by lines. In addition, the control system 160 provided herein may include a plurality of separate parts or may be in an integrated form, which will not be particularly limited in the embodiments of the present disclosure.

Referring to FIG. 14, the fracturing apparatus provided in the embodiment of the present disclosure further includes a temperature detector T disposed on the oil return pipeline L1 and configured to detect the temperature of the lubricating oil flowing from the power end 112 into the oil return pipeline L1.

The control system 160 is connected to the temperature detector T and configured to control the lubrication motor 1511 to keep on operating in the case where the plunger pump 110 stops operating and the temperature detected by the temperature detector T is greater than a first preset value.

With this configuration, in the case where the plunger pump stops operating, the control system may delay stopping the lubrication pump. If the temperature of the lubricating oil exceeds the first preset value, the lubricating oil heat dissipator keeps on operating, and after the temperature of the lubricating oil is lower than the first preset value, the lubrication pump and the lubricating oil heat dissipator stops operating.

Figure 15:
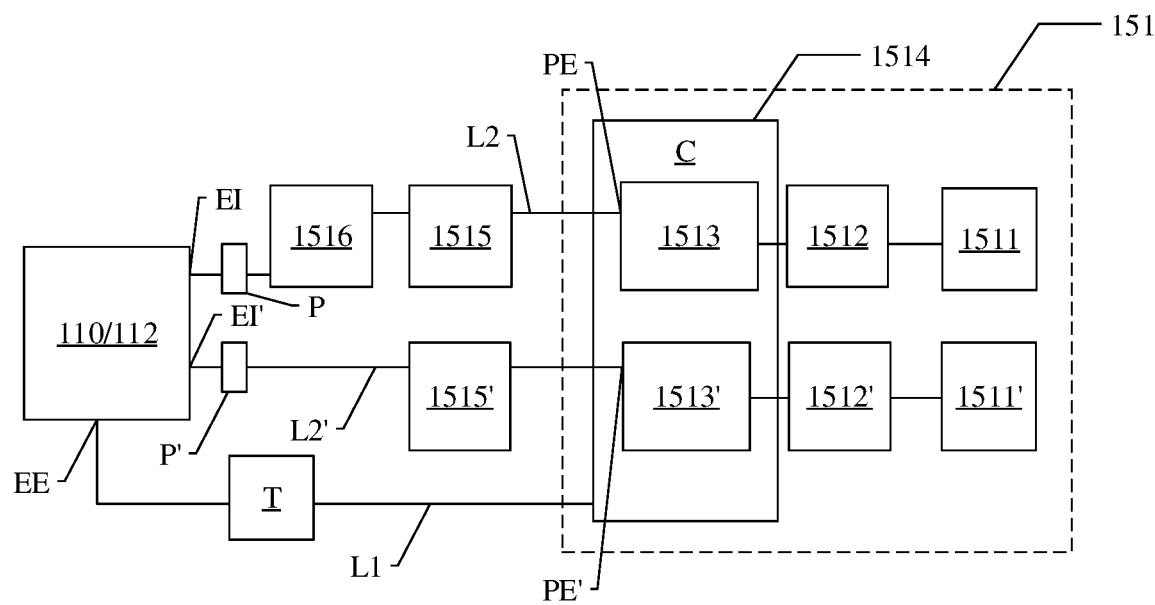
FIG. 15 is a schematic block diagram of part of an electrically driven fracturing apparatus according to an embodiment of the present disclosure.

FIG. 15 is a schematic block diagram of part of an electrically driven fracturing apparatus according to an embodiment of the present disclosure.

Referring to FIG. 15, the electrically driven fracturing apparatus includes a plunger pump 110 having a power end 112 and a power end lubricating system 151 configured to provide a lubricating oil for the power end of the plunger pump 110.

The power end lubricating system 151 includes, for example, two lubrication motors 1511 and 1511', two transmission devices 1512 and 1512', two lubrication pumps 1513 and 1513', and a lubricating oil tank 1514.

For example, the two lubrication motors 1511 and 1511' are located in the accommodation space of the lubricating oil tank 1514.

The lubrication motor 1511 provides power for the lubrication pump 1513 through the transmission device 1512 to drive the lubrication pump 1513 to operate. The oil inlet pipeline L2 is coupled to both the lubrication pump oil outlet PE of the lubrication pump 1513 and the power end oil inlet E1 of the power end 112. The lubrication pump 1513 is configured to pump the lubricating oil in the accommodation space C of the lubricating oil tank 1514 to the power end 112 of the plunger pump 110 through the oil inlet pipeline L2.

The lubrication motor 1511' provides power to the lubrication pump 1513' through the transmission device 1512' to drive the lubrication pump 1513' to operate. The oil inlet pipeline L2' is coupled to both the lubrication pump oil outlet PE' of the lubrication pump 1513' and the power end oil inlet E1' of the power end 112. The lubrication pump 1513' is configured to pump the lubricating oil in the accommodation space C of the lubricating oil tank 1514' to the power end 112 of the plunger pump 110 through the oil inlet pipeline L2'.

The number of the lubrication motors and the number of the transmission devices are not limited here. Two lubrication pumps may be driven by a single lubrication motor, or two lubrication pumps may be driven by two lubrication motors, respectively. Each lubrication pump may be connected directly or through a transmission mechanism to the lubrication motor.

Furthermore, in another example, the lubrication motor, the lubrication pump and the transmission device may be disposed in the accommodation space of the lubricating oil tank, and only the lubrication pump is immersed in the lubricating oil of the lubricating oil tank.

In the electrically driven fracturing apparatus provided in the embodiment of the present disclosure, two independent lubrication loops provide lubrication oil for different components within the power end 112 of the plunger pump. One of the two lubrication loops is a high-pressure lubrication loop (in which the pressure of the lubricating oil is high), while the other one is a low-pressure lubrication loop (in which the pressure of the lubricating oil is low). The high-pressure lubrication loop is provided for the components to be lubricated with high-pressure lubricating oil in the interior of the power end 112 of the plunger pump. The lower-pressure lubrication loop is provided for the components to be lubricated with large-flow and low-pressure lubricating oil in the interior of the power end 112 of the plunger pump. In some embodiments, all the components in the interior of the power end of the plunger pump can be lubricated. According to different requirements of the components, desired pressures and quantities of the lubricating oil are provided, thereby effectively ensuring a normal lubricating oil temperature and sufficient lubrication of each component within the power end of the plunger pump and effectively prolonging the service life of each component.

Referring continuously to FIG. 15, the fracturing apparatus further includes a temperature detector T disposed on the oil return pipeline L1, the power end oil outlet EE, or the lubricating oil tank to detect the temperature of the lubricating oil flowing from the power end 112 into the oil return pipeline L1. The oil return pipeline L1 is coupled to both the power end oil outlet EE and the accommodation space C of the lubricating oil tank 1514.

The control system 160 is connected to the temperature detector T and configured to control the motors of the lubrication pumps 1513 and 1513' to keep on operating in a case where the plunger pump 110 stops operating and the temperature detected by the temperature detector T is greater than a first preset value.

With this configuration, in a case where the plunger pump stops operating, the control system may delay stopping the lubrication pump. If the temperature of the lubricating oil exceeds the first preset value, a lubricating oil heat dissipator may keep on operating, and after the temperature of the lubricating oil is lower than the first preset value, the lubrication pump and the lubricating oil heat dissipator stop operating.

Referring to FIG. 15, the fracturing apparatus provided in the embodiment of the present disclosure further includes filters 1515 and 1515' that are disposed on the oil inlet pipelines L2 and L2', respectively, and an alarm. The alarm is for example disposed on a filter core of at least one of the filters 1515 and 1515'. The control system 160 is connected to the filters 1515 and 1515' and the alarm, and configured to allow the alarm to send an alert in the case where the pressure difference of the filter core of any one of the filters 1515 and 1515' is greater than a second preset value. In this way, an operator is reminded that the filter 1515 and 1515' may have a problem when the alert is sent.

In the case where the temperature of the lubricating oil exceeds the first preset value and the alarm on the filter core sends the alert, the control system 160 controls the plunger pump 110 to stop operating. In this way, the apparatus is protected against failure due to insufficient lubrication.

The fracturing apparatus provided in the embodiment of the present disclosure further includes at least one oil pressure detector (not shown) and at least one heat dissipation module, e.g., a heat dissipator 1516. The heat dissipator 1516 is disposed on the oil inlet pipeline L1 and configured to cool the lubricating oil in the oil inlet pipeline L1. In another example, a heat dissipator is further disposed on the oil inlet pipeline L1' and configured to cool the lubricating oil in the oil inlet pipeline L1'.

The at least one oil pressure detector is disposed on at least one oil inlet pipeline or the at least one power end oil inlet and configured to detect the pressure of the lubricating oil in the at least one oil inlet pipeline.

The control system 160 is connected to the at least one oil pressure detector and the at least one heat dissipator 1516 and configured to control the rotating speed of the at least one lubrication motor according to the value of the lubricating oil pressure detected by the at least one oil pressure detector and control the heat dissipation power of the at least one heat dissipator 1516 according to the value of the temperature detected by the temperature detector.

Figure 16:
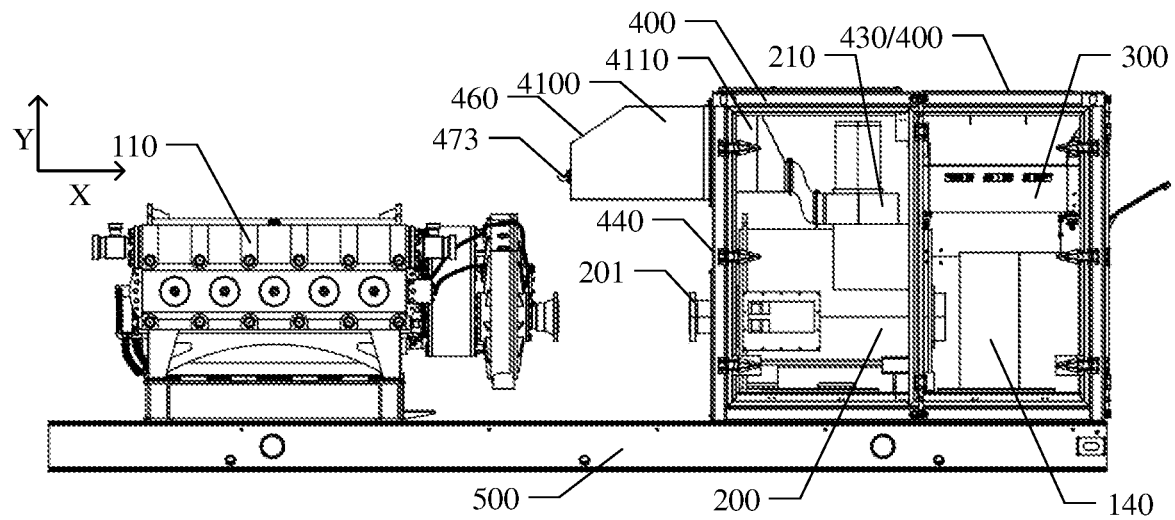
FIG. 16 is a side view of a partial structure of a fracturing apparatus according to an embodiment of the present disclosure.
Figure 17:
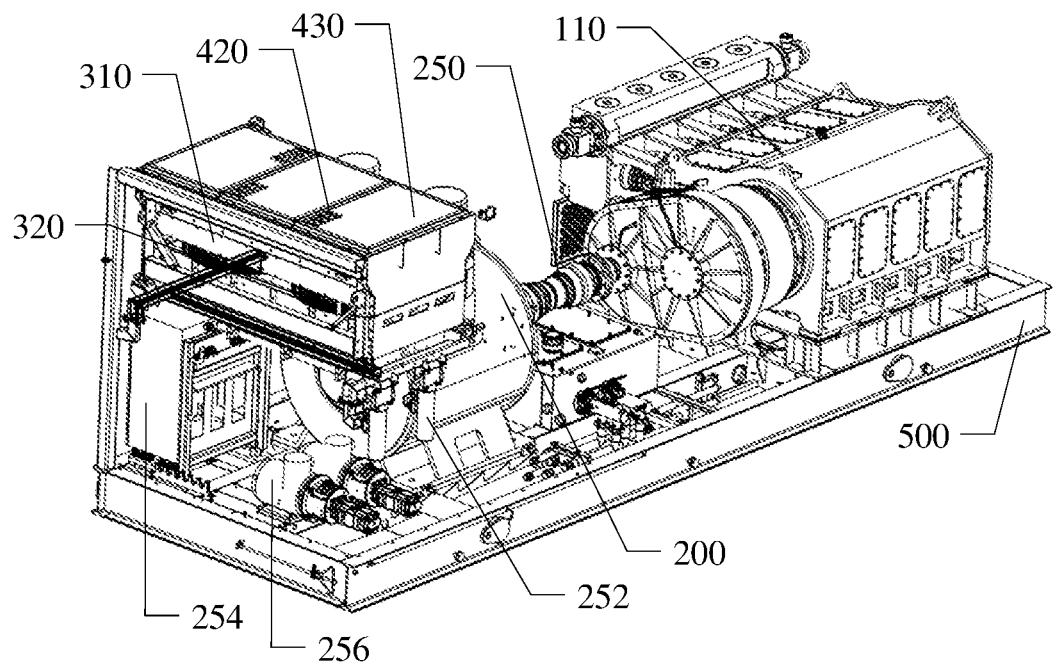
FIG. 17 is a schematic diagram of a partial structure of a fracturing apparatus according to an embodiment of the present disclosure.
Figure 18:
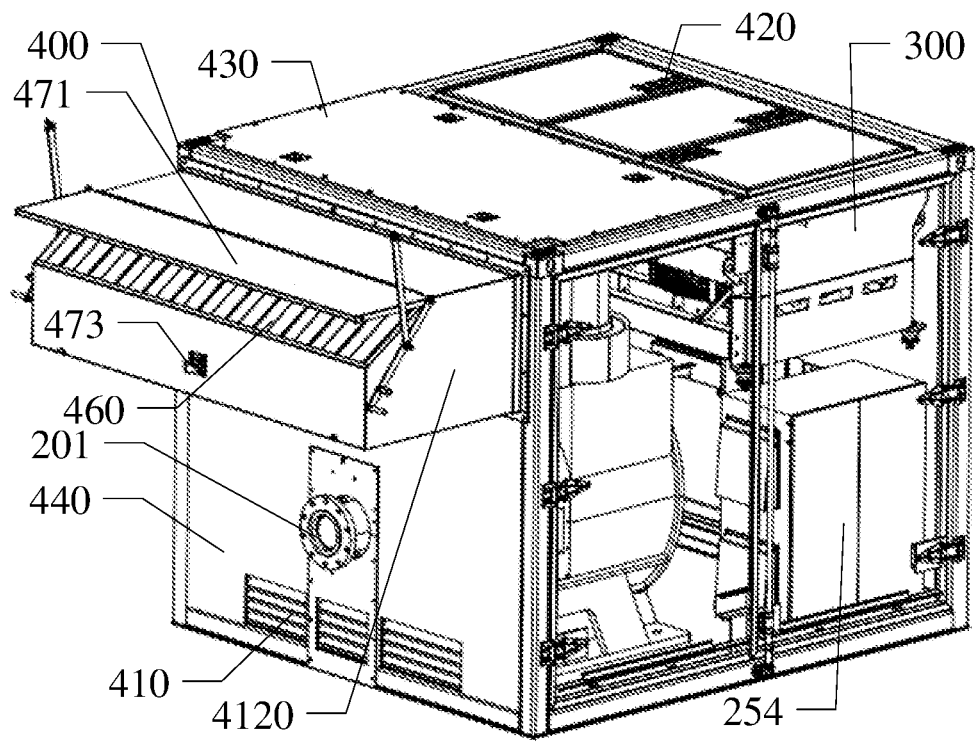
FIG. 18 is a schematic diagram of a noise reduction cabin and some devices in the noise reduction cabin of the fracturing apparatus shown in FIG. 16.

FIG. 16 is a side view of a partial structure of a fracturing apparatus according to an embodiment of the present disclosure. FIG. 17 is a schematic diagram of a partial structure of a fracturing apparatus according to an embodiment of the present disclosure, and FIG. 18 is a schematic diagram of a noise reduction cabin and some devices in the noise reduction cabin of the fracturing apparatus shown in FIG. 16. For example, in order to more clearly show each part of the noise reduction cabin, some cabin side walls or cabin doors of the noise reduction cabins shown in FIGS. 1 and 3 are omitted, and the overall appearance of the noise reduction cabin can refer to FIG. 4 described later.

As shown in FIGS. 16-18, the fracturing apparatus includes a plunger pump 110, a transmission shaft 250 and a main motor 200, and the main motor 200 is spaced apart from the plunger pump 110. For example, there is a certain distance between the main motor 200 and the plunger pump 110. For example, the main motor 200 can be an electric motor, the plunger pump 110 is connected with the main motor 200 through the transmission shaft 250, and the main motor 200 is configured to drive the plunger pump 110 to work through the transmission shaft 250. For example, the transmission shaft 250 is located between the plunger pump 110 and the main motor 200. For example, the plunger pump 110 includes a power end and a fluid end. The plunger reciprocates in the pump head body (valve box), which causes the change of the sealing volume in the pump head body to convey the fluid. For example, the power end includes a pump housing, a crankshaft and a crosshead assembly, etc., and is configured to reduce the rotating speed, to increase the torque, and to convert the rotating motion into reciprocating motion. For example, the fluid end includes a pump head body, a plunger and a valve, etc., and is configured to convert mechanical energy into fluid energy. For example, the main motor 200 is connected to the power end of the plunger pump 110 and is configured to provide power to the power end of the plunger pump 110.

As shown in FIGS. 16-18, the fracturing apparatus further includes an oil pipe 252 which is configured to be connected with the plunger pump 110. For example, the oil pipe 252 is configured to transmit lubricating oil, and the lubricating oil is configured to lubricate components in the power end of the plunger pump 110. For example, the fracturing apparatus further includes a lubricating motor 256 and a lubricating pump, the oil pipe 252 is connected with the lubricating pump, the lubricating motor 256 provides power to the lubricating pump to drive the lubricating pump to run. After the lubricating pump runs, the lubricating oil flows into the oil pipe 252. After flowing through the power end of the plunger pump 110, the lubricating oil in the oil pipe 252 will return to the lubricating oil tank. For example, the lubricating pump can be immersed in the lubricating oil in the lubricating oil tank.

As shown in FIGS. 16-18, the fracturing apparatus further includes a first radiator 300 spaced apart from the plunger pump 110, and the first radiator 300 is configured to dissipate heat from the oil in the oil pipe 252. For example, the first radiator 300 can be a lubricating oil radiator configured to dissipate heat from the lubricating oil in the oil pipe 252. For example, the first radiator 300 can include a heat dissipation pipe 310, the heat dissipation pipe 310 includes an oil inlet and an oil outlet, and the oil inlet and the oil outlet are respectively connected with the oil pipe 252. The lubricating oil transmitted in the oil pipe 252 flows into the heat dissipation pipe 310 through the oil inlet of the heat dissipation pipe 310, and then flows into the oil pipe 252 from the oil outlet of the heat dissipation pipe 310 after heat dissipation through the heat dissipation pipe 310. For example, the first radiator 300 can be located on the oil inlet pipeline of the plunger pump 110 or on the oil outlet pipeline of the plunger pump 110.

As shown in FIGS. 16-18, the fracturing apparatus further includes a noise reduction cabin 400, and the main motor 200, the first radiator 300 and at least part of the oil pipe 252 are located at the inner side of the noise reduction cabin 400, and the plunger pump 110 is located at the outer side of the noise reduction cabin 400.

The plunger pump will produce a high pressure of nearly 25600 Psi in the working process. Once the high-pressure liquid leaks, it will produce great destructive power. The fracturing apparatus provided by the present disclosure is provided with a noise reduction cabin, which can separate structures, such as the main motor and the first radiator, etc., from the plunger pump, thus not only reducing the noise generated by the structures, such as the main motor and the first radiator, etc., and reducing the interference between electrical components, but also reducing the risk that the structures, such as the main motor and the first radiator, etc., are damaged by high-pressure liquid.

For example, as shown in FIGS. 16-18, the noise reduction cabin 400 includes at least one cabin side wall 440. For example, one cabin side wall 440 is arranged between the main motor 200 and the plunger pump 110, and the cabin side wall 440 can be provided with an opening, the transmission shaft 250 passes through the opening to connect with the main motor 200. For example, a flange 201 is provided at the opening for connection with the transmission shaft 250.

For example, as shown in FIGS. 16-18, the lubricating motor 256 is located in the noise reduction cabin 400. The noise reduction cabin 400 can not only reduce the noise of the lubricating motor 256, but also reduce the risk of the lubricating motor 256 being damaged by high-pressure liquid.

For example, as shown in FIGS. 16-18, the fracturing apparatus further includes a platform 500, and the plunger pump 110, the main motor 200 and the noise reduction cabin 400 are located on the supporting surface of the platform 500. For example, the platform 500 can be a skid-mounted platform. For example, the supporting surface can be a plane perpendicular to the Y direction shown in FIG. 16. The supporting surface is defined as such a plane to better illustrate the positional relationship between other structures and the plane where the supporting surface is located, but it does not mean that the surface of the platform facing the main motor must be a plane. For example, in the case where the surface of the platform has convex structures, the supporting surface as a plane can be a plane located at the bottom of these convex structures or a plane passing through a point on the surface of the platform. In the direction perpendicular to the supporting surface, the direction from the opposite side of the supporting surface of the platform to the supporting surface is called the upward direction (that is, the direction indicated by the arrow in the X direction), and the direction from the supporting surface to the opposite side of the supporting surface of the platform is called the downward direction. In the direction parallel to the supporting surface, the direction from the edge of the noise reduction cabin to the center of the noise reduction cabin is called the inward direction, and the direction from the center of the noise reduction cabin to the edge of the noise reduction cabin is called the outward direction. Therefore, the relative positional relationships indicated by "inner" and "outer" also have a clear meaning.

For example, as shown in FIGS. 16-18, the noise reduction cabin 400 includes an air inlet 410 and an air outlet 420, and the distance between the air outlet 420 and the supporting surface of the platform 500 is greater than the distance between the air inlet 410 and the supporting surface. For example, the air outlet 420 is located on the upper side of the air inlet 410. The distance between the air outlet and the supporting surface can indicate the distance between the end or surface of the air outlet closest to the supporting surface and the supporting surface, and the distance between the air inlet and the supporting surface can indicate the distance between the end or surface of the air inlet closest to the supporting surface and the supporting surface. By arranging the air outlet on the upper side of the air inlet, the air in the external environment can blow through the components, such as the main motor and the first radiator, etc., during the process of spreading upward (to the air outlet) from the air inlet, which is beneficial to the cooling of the components, such as the main motor and the first radiator, etc. In addition, by arranging the air outlet on the upper side of the air inlet, it is also beneficial to reducing the reflection and transmission of noise among the devices in the noise reduction cabin, thus being beneficial to reducing the noise.

For example, as shown in FIGS. 16-18, the noise reduction cabin 400 includes a cabin top wall 430. The cabin top wall 430 refers to a cabin wall farthest from the platform 500 in the noise reduction cabin 400. For example, the cabin top wall 430 is closer to the first radiator 300 than the platform 500. By arranging the first radiator closer to the cabin top wall, it can be beneficial for the first radiator to blow upward to dissipate heat, and it can achieve better noise reduction effect while dissipating heat form the lubricating oil.

For example, as shown in FIGS. 16-18, the lubricating motor 256 can be located at a side of the main motor 200 away from the plunger pump 110. For example, the lubricating motor 256 can be located between the first radiator 300 and the platform 500. For example, the orthographic projection of the lubricating motor 256 on the supporting surface of the platform 500 overlaps with the orthographic projection of the first radiator 300 on the supporting surface. For example, the first radiator 300 is located directly above the lubricating motor 256.

In the fracturing apparatus provided by the present disclosure, the first radiator is arranged closer to the cabin top wall, and other device (such as the lubricating motor) is arranged between the first radiator and the platform, which can improve the utilization rate of the space in the noise reduction cabin.

For example, as shown in FIGS. 16-18, the first radiator 300 can be arranged on the frame of the noise reduction cabin 400. For example, the first radiator 300 can be arranged on the cabin body of the noise reduction cabin 400, and the main motor 200 and the lubricating motor 256 are covered in the cabin body by the noise reduction cabin 400.

For example, as shown in FIGS. 16-18, the first radiator 300 is located at a side of the main motor 200 away from the plunger pump 110, a second radiator 210 is provided at a side of the main motor 200 away from the platform 500, the second radiator 210 is configured to dissipate heat from the main motor 200, and the cabin top wall 430 is closer to the second radiator 210 than the platform 500. For example, the second radiator 210 can be a cooling fan.

For example, as shown in FIGS. 16-18, both the first radiator 300 and the second radiator 210 are located close to the cabin top wall 430, which is favorable for dissipating heat from the lubricating oil and the main motor. For example, a straight line parallel to the supporting surface of the platform 500 can pass through the first radiator 300 and the second radiator 210. For example, the orthographic projections of the first radiator 300 and the second radiator 210 on a straight line perpendicular to the supporting surface overlap with each other.

The embodiment of the present disclosure illustratively takes the second radiator as a component separated from the main motor, but it is not limited to this case, and the second radiator can also be integrated with the main motor.

For example, as shown in FIGS. 16-18, the cabin top wall 430 is provided with an air outlet 420, the first radiator 300 includes a heat dissipation pipe 310 and a fan 320, the heat dissipation pipe 310 is located between the fan 320 and the air outlet 420, the fan 320 is configured to blow air to the heat dissipation pipe 310 to dissipate heat from the lubricating oil in the heat dissipation pipe 310, and the heat dissipation pipe 310 is opposite to the air outlet 420, so that the heat of the lubricating oil in the heat dissipation pipe 310 is directly discharged outside the cabin. For example, the heat dissipation pipe 310 is located above the fan 320, that is, at a side of the fan 320 away from the platform 500. For example, the air outlet 420 can have a mesh structure.

For example, as shown in FIGS. 16-18, the fan 320 is configured to blow and dissipate heat from the lubricating oil flowing in the heat dissipation pipe 310, that is, the fan 320 blows the heat dissipation pipe 310 above it, so as to discharge the heat outside the cabin from the air outlet 420. In the process that the fan 320 blows upward, negative pressure is formed inside the noise reduction cabin 400, and the external air enters the noise reduction cabin 400 from the air inlet 410, and flows to the air outlet 420 after passing through the devices in the noise reduction cabin 400 (such as the main motor 200 and the lubricating motor 256, etc.), so as to cool the devices in the noise reduction cabin 400 and ensure the normal operation of the devices in the cabin. This process meets the air quantity required by the devices when working and the air quantity required for heat dissipation. In addition, the air outlet is arranged on the cabin top wall of the noise reduction cabin, so that the air outlet is located above the devices in the cabin, and the reflection and transmission of noise among the devices can be weakened.

For example, as shown in FIGS. 16-18, the fracturing apparatus further includes an electric control cabinet 254, and the electric control cabinet 254 is located in the noise reduction cabin 400, thereby not only reducing the noise generated by the electric control cabinet, but also reducing the risk that the electric control cabinet is damaged by high-pressure liquid in the plunger pump.

For example, as shown in FIGS. 16-18, the main motor 200 is located between the electric control cabinet 254 and the plunger pump 110. For example, the main motor 200 can be electrically connected with electrical devices in the electric control cabinet 254. For example, a frequency converter 141 is provided in the electric control cabinet 254, and the main motor 200 can be electrically connected with the frequency converter 131. For example, the lubricating motor 256 and other devices can also be connected with cables from the frequency converter 141 in the electric control cabinet 254.

For example, the electric control cabinet 254 is located between the first radiator 300 and the platform 500, and the orthographic projection of the electric control cabinet 254 on the supporting surface of the platform 500 overlaps with the orthographic projection of the first radiator 300 on the supporting surface. For example, the electric control cabinet 254 and the lubricating motor 256 are both arranged on the platform 500 and both located between the first radiator 300 and the platform 500, which can effectively utilize the space in the noise reduction cabin.

For example, the external air entering from the air inlet 410 on the cabin door 450 adjacent to the electric control cabinet 254 can cool the electric control cabinet 254.

Without conflict, various embodiments of the present disclosure and features in the embodiments can be combined with each other to obtain new embodiments.

The various components or structures in the drawings are not strictly drawn to actual scale, and the sizes of the various components or structures may be exaggerated or reduced for the sake of clarity, but these should not be used to limit the scope of the disclosure.

The foregoing embodiments merely are exemplary embodiments of the disclosure, and not intended to define the scope of the disclosure, and the scope of the disclosure is determined by the appended claims.

What is claimed is:

1. Fracturing equipment comprising an electric-driven apparatus and an electric-power supply apparatus, wherein:
    the electric-driven apparatus comprises at least one motor configured to power at least one plunger pump, at least one lubrication module comprising a lubricating oil tank, at least one heat dissipation module, and a temperature detector,
    the electric-power supply apparatus comprises a first electric-power supply and a second electric-power supply,
    the at least one motor is powered by the first electric-power supply, and the at least one lubrication module and the at least one heat dissipation module are powered by at least one of the first electric-power supply or the second electric-power supply,
    the plunger pump comprises a power end, the power end comprises a power end oil outlet coupled to the lubricating oil tank through an oil return pipeline, and
    the temperature detector is disposed on any one of the oil return pipeline, the power end oil outlet, and the lubricating oil tank, and is configured to detect a temperature of lubricating oil flowing from the power end into the oil return pipeline.

2. The fracturing equipment according to claim 1, wherein the second electric-power supply is coupled to the first electric-power supply, and configured to supply power to the first electric-power supply.

3. The fracturing equipment according to claim 1, further comprising a grounding system,
    wherein the grounding system comprises a first grounding terminal which is spaced from each of the electric-driven apparatus and the electric-power supply apparatus by a preset distance, and
    at least one of the electric-driven apparatus and the electric-power supply apparatus are connected to the first grounding terminal, and the first grounding terminal is configured to ground the at least one of the electric-driven apparatus and the electric-power supply apparatus.

4. The fracturing equipment according to claim 3, wherein the electric-power supply apparatus further comprises an electric-power converter device electrically connected with the first electric-power supply, and an electric-power distribution device electrically connected with the electric-power converter device;
    at least one of the electric-power converter device and the electric-power distribution device is connected to the first grounding terminal.

5. The fracturing equipment according to claim 4, wherein:
    the grounding system comprises a first grounding wire; and
    at least one of the electric-power converter device and the electric-power distribution device is connected to the first grounding wire and is connected to the first grounding terminal through the first grounding wire.

6. The fracturing equipment according to claim 5, wherein:
    the first grounding wire is configured to surround the at least one of the electric-power converter device and the electric-power distribution device, and a planar shape of the first grounding wire is a closed loop.

7. The fracturing equipment according to claim 1, wherein:
    the lubricating oil tank defines an accommodation space configured for storing lubricating oil, the at least one lubrication module further comprises at least one lubrication pump having a lubrication pump oil inlet and a lubrication pump oil outlet that are coupled to each other, and at least one lubrication motor configured to provide power for the at least one lubrication pump, wherein the lubrication pump oil inlet is coupled to the accommodation space of the lubricating oil tank.

8. The fracturing equipment according to claim 7, wherein the lubrication pump oil inlet of the lubrication pump is directly exposed in the accommodation space of the lubricating oil tank.

9. The fracturing equipment according to claim 7, wherein a portion of the at least one lubrication pump is immersed in the lubricating oil in the lubricating oil tank.

10. The fracturing equipment according to claim 7, wherein the lubrication pump oil inlet of the at least one lubrication pump is immersed in the lubricating oil in the lubricating oil tank.

11. The fracturing equipment according to claim 7, wherein:
the at least one lubrication module comprises at least one transmission device connecting the at least one lubrication motor to the at least one lubrication pump;
at least a portion of at least one of the lubrication motor and the lubrication pump is located in the accommodation space; and
at least a portion of the at least one transmission device is located in the accommodation space.

12. The fracturing equipment according to claim 11, wherein the at least one lubrication motor is configured to drive the at least one lubrication pump to deliver the lubricating oil to the at least one plunger pump through at least one oil inlet pipeline.

13. The fracturing equipment according to claim 12,
wherein the plunger pump further comprises a hydraulic end,
wherein the power end further comprises at least one power end oil inlet,
wherein the lubrication pump oil outlet of the at least one lubrication pump is coupled to the at least one power end oil inlet through the at least one oil inlet pipeline.

14. The fracturing equipment according to claim 13, wherein the at least one heat dissipation module is disposed on the at least one oil inlet pipeline and configured to cool the lubricating oil in the at least one oil inlet pipeline.

15. The fracturing equipment according to claim 14, wherein the at least one heat dissipation module comprises a first radiator spaced apart from the plunger pump, the first radiator being configured to dissipate heat from the lubricating oil in the at least one oil inlet pipeline.

16. The fracturing equipment according to claim 15, wherein:
the first radiator comprises a heat dissipation pipe and a fan, and the fan is configured to blow air to the heat dissipation pipe to dissipate heat.

17. The fracturing equipment according to claim 14, further comprising a control system connected to the temperature detector and the at least one lubrication module, and configured to control the at least one lubrication module,
wherein the control system is configured to control the at least one lubrication motor to keep on operating when the plunger pump stops operating and the temperature detected by the temperature detector is greater than a first preset value.

18. The fracturing equipment according to claim 17, wherein the control system is configured to control the plunger pump to stop operating when the temperature detected by the temperature detector is greater than the first preset value and that an alarm sends an alert.

* * * * *